United States Patent
Saneto et al.

(10) Patent No.: US 9,946,111 B2
(45) Date of Patent: Apr. 17, 2018

(54) LIQUID CRYSTAL DISPLAY DEVICE

(71) Applicant: FUJIFILM Corporation, Tokyo (JP)

(72) Inventors: Ryuji Saneto, Kanagawa (JP);
Katsufumi Ohmuro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 235 days.

(21) Appl. No.: 15/050,594

(22) Filed: Feb. 23, 2016

(65) Prior Publication Data

US 2016/0170262 A1    Jun. 16, 2016

Related U.S. Application Data

(63) Continuation of application No. PCT/JP2014/071914, filed on Aug. 21, 2014.

(30) Foreign Application Priority Data

Aug. 23, 2013    (JP) .................................. 2013-173930

(51) Int. Cl.
*G02F 1/1335*    (2006.01)
*G02B 5/26*    (2006.01)
(Continued)

(52) U.S. Cl.
CPC ......... *G02F 1/133536* (2013.01); *G02B 5/26* (2013.01); *G02B 5/30* (2013.01);
(Continued)

(58) Field of Classification Search
CPC ......... G02F 1/133606; G02F 1/133536; G02F 1/133555; G02F 1/133603;
(Continued)

(56) References Cited

U.S. PATENT DOCUMENTS 8,390,913 B2    3/2013    Naitou et al.
9,110,203 B2    8/2015    Seo et al.
(Continued)

FOREIGN PATENT DOCUMENTS

JP    H01-133003 A    5/1989
JP    3448626 B2    9/2003
(Continued)

OTHER PUBLICATIONS

International Preliminary Report on Patentability issued by WIPO dated Mar. 3, 2016, in connection with International Patent Application No. PCT/JP2014/071914.
(Continued)

*Primary Examiner* — Nathanael R Briggs
*Assistant Examiner* — William Peterson
(74) *Attorney, Agent, or Firm* — Edwards Neils LLC; Jean C. Edwards, Esq.

(57) ABSTRACT

A liquid crystal display device improved in front surface luminance, having a backlight unit, a light conversion member, a polarization separating member, a liquid crystal cell, and a display-side polarizer; the backlight unit includes an unpolarized blue light source and a reflection member that converts circularly-polarized to unpolarized blue light and reflects same; the light conversion member includes a circularly polarized luminescence fluorescent material that emits green and red lights which are circularly-polarized; the polarization separating member includes a reflection polarizer that separates the unpolarized blue light into blue transmitted light that is right- or left-circularly-polarized light and blue reflected light that is the other circularly-polarized light and a λ/4 plate that converts the blue transmitted light, the green and red lights, which are circularly-polarized, to linearly-polarized lights; and an absorption axis of the display-side polarizer is parallel to vibration direc-
(Continued)

tions of the blue, green and red lights, which are linearly-polarized.

9 Claims, 4 Drawing Sheets

(51) Int. Cl.
*G02B 5/30* (2006.01)
*F21V 8/00* (2006.01)
*G02F 1/13363* (2006.01)

(52) U.S. Cl.
CPC .......... *G02B 6/005* (2013.01); *G02B 6/0056* (2013.01); *G02F 1/133555* (2013.01); *G02F 1/133603* (2013.01); *G02F 1/133617* (2013.01); *G02F 2001/133531* (2013.01); *G02F 2001/133541* (2013.01); *G02F 2001/133614* (2013.01); *G02F 2001/133638* (2013.01)

(58) Field of Classification Search
CPC ... G02F 1/133617; G02F 2001/133607; G02F 2001/133541; G02F 2001/133638; G02F 2001/133614; G02F 2001/133531; G02B 5/26; G02B 5/30; G02B 6/005; G02B 6/0056
USPC .......................................................... 349/64
See application file for complete search history.

(56) References Cited

U.S. PATENT DOCUMENTS

| 2001/0055208 A1* | 12/2001 | Kimura ................ G02B 26/001 362/260 |
| 2011/0038025 A1* | 2/2011 | Naitou .................. B82Y 10/00 359/241 |
| 2011/0216271 A1* | 9/2011 | Suzuki ................ G02F 1/13362 349/71 |
| 2012/0206935 A1 | 8/2012 | Seo et al. |

FOREIGN PATENT DOCUMENTS

| JP | 2009-242501 A | 10/2009 |
| JP | 2012-502322 A | 1/2012 |
| JP | 2012-022028 A | 2/2012 |
| JP | 2012-169271 A | 9/2012 |
| WO | 95/17699 A1 | 6/1995 |
| WO | 2010/028728 A1 | 3/2010 |

OTHER PUBLICATIONS

International Search Report issued in connection with International Patent Application No. PCT/JP2014/071914 dated Nov. 18, 2014.
Written Opinion issued in connection with International Patent Application No. PCT/JP2014/071914 dated Nov. 18, 2014.
Jian Chen et al.; A High-Efficiency Wide-Color-Gamut Solid-State Backlight System for LCDs Using Quantum Dot Enhancement Film; SID 2012 Digest; Jun. 2012; pp. 895-896; vol. 43, Issue 1; Society for Information Display; U.S.

* cited by examiner

LIQUID CRYSTAL DISPLAY DEVICE

CROSS-REFERENCE TO RELATED APPLICATIONS

This application is a Continuation of PCT International Application No. PCT/JP2014/071914, filed on Aug. 21, 2014, which was published under PCT Article 21(2) in Japanese, and claims priority under 35 U.S.C. Section 119(a) to Japanese Patent Application No. 2013-173930 filed on Aug. 23, 2013. The above applications are hereby expressly incorporated by reference, in their entirety, into the present application.

BACKGROUND OF THE INVENTION

1. Field of the Invention

The present invention relates to a liquid crystal display device and, specifically to a liquid crystal display device having improved front surface luminance.

2. Description of the Related Art

A liquid crystal display device (hereinafter, also referred to as LCD) has been used in a broadening range of fields every year as an image display device which has low power consumption and saves spaces. A liquid crystal display device has a constitution in which a backlight (hereinafter, also referred to as BL), a backlight-side polarizing plate, a liquid crystal cell, a display-side polarizing plate, and the like are provided in this order.

Recently, for liquid crystal display devices, development for power saving, high definition, and color reproducibility improvement has been underway in order to improve LCD performance. Hitherto, while there has been a significant demand for power saving, high definition, and color reproducibility improvement in small-sized display devices such as tablet PCs and smartphones, development for high definition (4K2K) and high color reproduction region (European Broadcasting Union (EBU) ratio of 100% or higher) are underway in large-sized display devices for next-generation displays with current TV standards (FHD, 72% of National Television System Committee (NTSC) ratio≈100% of EBU ratio), and there is an intensifying demand for power saving, high definition, and color reproducibility improvement in liquid crystal display devices.

In accordance with power saving in the backlight, there are cases in which an optical sheet member is provided between the backlight and the backlight-side polarizing plate in order to increase the light utilization efficiency. The optical sheet member is an optical element that transmits only light rays vibrating in a specific polarization direction among incidence light rays vibrating in random directions and reflects light rays vibrating in other polarization directions. As a core component of a low-power LCD developed in response to an increase in mobile devices and a decrease in the power consumption of home appliance, it is expected to increase luminance (the degree of brightness of a light source per unit area) by solving the low light utilization efficiency of LCDs.

As the above-described optical sheet member, a technique is known in which a specific optical sheet member (Dual Brightness Enhancement Film (registered trademark, DBEF) or the like) is provided between the backlight and the backlight-side polarizing plate so as to improve the light utilization ratio of the BL by means of light recycling and thus the luminance of the BL is improved while saving power in the backlight (refer to JP3448626B). Similarly, JP1989-133003A (JP-H1-133003A) describes a polarizing plate obtained by laminating a $\lambda/4$ plate and a cholesteric liquid crystalline phase. When the bandwidth is broadened in a layer formed by fixing three or more layers of a cholesteric liquid crystalline phase having different pitches between the cholesteric liquid crystalline phases, it is possible to improve the light utilization ratio of the BL by means of light recycling.

However, the above-described optical sheet member has a complicated member constitution, and thus, in order to distribute the optical sheet member in the market, it becomes essential to reduce the cost by decreasing the number of members by means of additional integration of functions of the members.

From the viewpoint of high definition and color reproducibility improvement of a liquid crystal display device, a method for sharpening the light emission spectrum of the backlight is also known. For example, JP2012-169271A describes a method for increasing luminance and improving color reproducibility by realizing white light using a quantum dot (QD) which emits red light and green light as a fluorescent body between a blue LED and a light guide plate. In SID'12 DIGEST p. 895, a method of combining a light conversion sheet (QDEF, also referred to as quantum dot sheet) in which a quantum dot is used in order to improve the color reproducibility of the LCD is proposed.

In addition, JP2012-22028A proposes a method for decreasing the energy loss in a color filter and increasing the energy efficiency of a liquid crystal display by disposing a fluorescent layer including a fluorescent body made up of quantum dots on a path of light radiated from a violet LED or a blue LED.

Meanwhile, in JP2012-502322A, a liquid crystal display device is proposed in which a blue light source, a cholesteric liquid crystal, a light conversion layer capable of altering the wavelength of light to a longer value, and a $\lambda/4$ plate are combined together, thereby providing clearly visible bright images under a bright ambient light condition with a low power consumption and improving long-term reliability.

As a light conversion material in which the above-described quantum dot or the like is used, recently, a compound-based circularly polarized luminescence fluorescent material also has been known (refer to JP2009-242501A). However, JP2009-242501A does not describe any examples in which the compound-based circularly-polarized light-emitting fluorescent material is actually used for a liquid crystal display device.

SUMMARY OF THE INVENTION

Since the constitutions of JP3448626B and JP1989-133003A (JP-H1-133003A) for improving the light utilization efficiency have a multilayer constitution and a complicated structure in consideration of the wavelength dispersibility of the members in order to impart a broadband light recycling function to white light, there is a problem of high manufacturing costs. In addition, the fluorescent light (PL) application techniques described in JP2012-169271A, JP2012-22028A, and SID'12 DIGEST p. 895 are techniques for realizing high luminance and color reproducibility improvement using a quantum dot (hereinafter, also referred to as QD); however, for additional improvement of the luminance, a combination of JP3448626B and JP1989-133003A (JP-H1-133003A) thereinto is essential, and thus there is the same problem as in JP3448626B and JP1989-133003A (JP-H1-133003A). JP2012-502322A describes a light conversion member that emits polarized light by being combined with a cholesteric liquid crystal or a $\lambda/4$ plate, but improvement in the utilization efficiency of light that excites fluorescent light emission is not mainly described, and there is still a problem in luminance improvement.

An object of the present invention to be achieved is to provide a liquid crystal display device having a new member constitution which is capable of improving front surface luminance including improvement in the light utilization ratio of BL, which is required for power saving. In addition, another object of the present invention is to reduce costs by decreasing the number of members by means of additional integration of the functions of members.

That is, an object of the present invention to be achieved is to provide a liquid crystal display device having improved front surface luminance.

The present inventors carried out intensive studies in order to achieve the above-described object and consequently found that, when a polarization separating member capable of transmitting, out of unpolarized blue light, light circularly polarized in one direction and reflecting light circularly polarized in the other direction using a backlight of unpolarized blue light, a light conversion member including a circularly polarized luminescence fluorescent material that emits green circularly-polarized light and red circularly-polarized light when unpolarized blue light enters the fluorescent material, and λ/4 plate capable of respectively converting blue circularly-polarized light, green circularly-polarized light, and red circularly-polarized light to linearly-polarized light are combined together, front surface luminance can be improved by increasing the light utilization ratio, and the above-described object can be achieved.

That is, the above-described object is achieved using the present invention having the following constitutions.

[1] A liquid crystal display device, including a backlight unit, a light conversion member, a polarization separating member, a liquid crystal cell, and a display-side polarizer disposed in this order, in which the backlight unit includes a light source that emits unpolarized blue light having a light emission central wavelength in a wavelength range of 430 nm to 480 nm and a reflection member that converts, out of right-circularly-polarized light and left-circularly-polarized light in a wavelength range of 430 nm to 480 nm, one circularly-polarized light to unpolarized blue light and reflects the unpolarized blue light, the light conversion member includes a circularly polarized luminescence fluorescent material that, due to the unpolarized blue light entering the light conversion member, emits green light which has a light emission central wavelength in a wavelength range of 500 nm to 600 nm and is circularly-polarized light and red light which has a light emission central wavelength in a wavelength range of 600 nm to 650 nm and is circularly-polarized light, the polarization separating member includes a reflection polarizer that separates the unpolarized blue light entering the reflection polarizer in a normal direction to the polarization separating member into blue transmitted light that is one circularly-polarized light of right-circularly-polarized light and left-circularly-polarized light and blue reflected light that is the other circularly-polarized light, transmits at least some of green light in a wavelength range of 500 nm to 600 nm, and transmits at least some of red light in a wavelength range of 600 nm to 650 nm and a λ/4 plate that respectively converts the blue transmitted light that is circularly-polarized light, the green light that is circularly-polarized light, and the red light that is circularly-polarized light to blue light that is linearly-polarized light, green light that is linearly-polarized light, and red light that is linearly-polarized light in this order from a backlight side, and an absorption axis of the display-side polarizer is parallel to vibration directions of the blue light that is linearly-polarized light, the green light that is linearly-polarized light, and the red light that is linearly-polarized light.

[2] The liquid crystal display device according to [1], in which, preferably, the reflection polarizer is a light reflection layer formed by fixing the cholesteric liquid crystalline phase, and the light reflection layer formed by fixing a cholesteric liquid crystalline phase has a reflection central wavelength in a wavelength range of 430 nm to 480 nm, reflects any one of right-circularly-polarized light and left-circularly-polarized light at the reflection central wavelength, transmits the other light, transmits at least some of green light in a wavelength range of 500 nm to 600 nm, and transmits at least some of red light in a wavelength range of 600 nm to 650 nm.

[3] The liquid crystal display device according to [2], in which, preferably, the light emission central wavelength of the unpolarized blue light emitted from the backlight unit is in a wavelength range of 440 nm to 460 nm, the reflection central wavelength of the light reflection layer formed by fixing the cholesteric liquid crystalline phase is in a wavelength range of 440 nm to 460 nm, and a difference between the light emission central wavelength of the unpolarized blue light emitted from the backlight unit and the reflection central wavelength of the light reflection layer formed by fixing the cholesteric liquid crystalline phase preferably is 50 nm or lower.

[4] The liquid crystal display device according to any one of [1] to [3], in which, preferably, an angle formed between a slow axis of the λ/4 plate and an absorption axis of the display-side polarizer is 45°, and the λ/4 plate satisfies Expressions (1) to (3) below:

$$Re(\lambda)=\lambda/4\pm10 \text{ nm} \quad \text{Expression (1)}$$

(in Expression (1), λ represents the light emission central wavelength (unit: nm) of blue light that is circularly-polarized light, and Re (λ) represents a retardation (unit: nm) in the in-plane direction at a wavelength of λ nm);

$$Re(\lambda)=\lambda/4\pm10 \text{ nm} \quad \text{Expression (2)}$$

(in Expression (2), λ represents the light emission central wavelength (unit: nm) of green light that is circularly-polarized light, and Re (λ) represents a retardation (unit: nm) in the in-plane direction at a wavelength of λ nm); and $$Re(\lambda)=\lambda/4\pm10 \text{ nm} \quad \text{Expression (3)}$$

(in Expression (3), λ represents the light emission central wavelength (unit: nm) of red light that is circularly-polarized light, and Re (λ) represents a retardation (unit: nm) in the in-plane direction at a wavelength of λ nm).

[5] The liquid crystal display device according to any one of [1] to [4], preferably, further including: a backlight-side polarizer provided between the polarization separation member and the liquid crystal cell, in which the backlight-side polarizer and the absorption axis of the display-side polarizer are orthogonal to each other.

[6] The liquid crystal display device according to [5], preferably, further including: two polarizing plate protective films provided on both surfaces of the backlight-side polarizer, in which, out of the two polarizing plate protective films, at least the polarizing plate protective film on a polarization separation member side is a cellulose acylate film.

[7] The liquid crystal display device according to any one of [1] to [6], in which all of the green light that is circularly-polarized light and the red light that is circularly-polarized light which are emitted from the light conversion member preferably have a peak with a light emission intensity having a half bandwidth of 100 nm or smaller.

[8] The liquid crystal display device according to any one of [1] to [7], in which the entire backlight unit is preferably a surface light source.

[9] The liquid crystal display device according to any one of [1] to [8], in which the unpolarized blue light emitted from the backlight unit preferably has a peak with a light emission intensity a half bandwidth of which is 30 nm or smaller.

According to the present invention, it is possible to provide a liquid crystal display device having improved front surface luminance.

DESCRIPTION OF THE PREFERRED EMBODIMENTS

Figure 1:
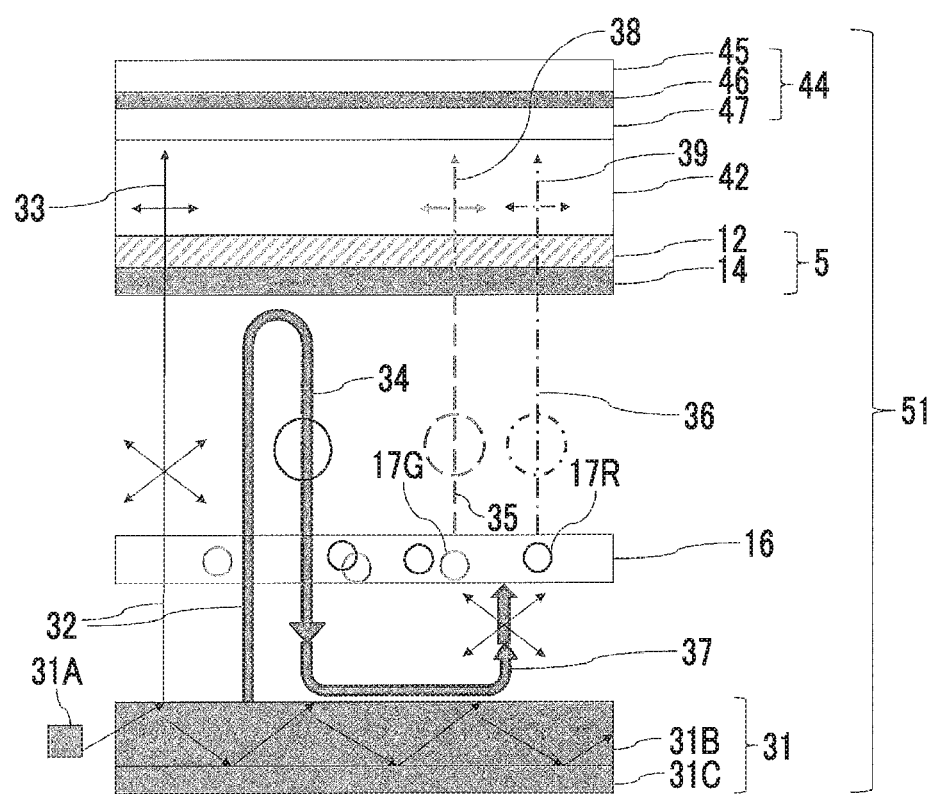
FIG. 1 is a schematic view illustrating a section of an example of a liquid crystal display device of the present invention.

Hereinafter, a liquid crystal display device of the present invention will be described in detail.

Constitution requirements described below will be, in some cases, described based on a typical embodiment of the present invention, but the present invention is not limited to the above-described embodiment. Meanwhile, in the present specification, numerical ranges expressed using "to" include numerical values before and after the "to" as the lower limit value and the upper limit value.

In the present specification, the "half bandwidth" of a peak refers to the width of the peak at the half of the peak height. Unpolarized light refers to light not having polarization characteristics.

[Liquid Crystal Display Device]

In a liquid crystal display device of the present invention, a backlight unit, a light conversion member, a polarization separating member, a liquid crystal cell, and a display-side polarizer are disposed in this order;

the backlight unit includes a light source that emits unpolarized blue light having a light emission central wavelength in a wavelength range of 430 nm to 480 nm, and a reflection member that converts, out of right-circularly-polarized light and left-circularly-polarized light in a wavelength range of 430 nm to 480 nm, one circularly-polarized light to unpolarized blue light and reflects the unpolarized blue light;

the light conversion member includes a circularly polarized luminescence fluorescent material that, due to the unpolarized blue light entering the light conversion member, emits green light which has a light emission central wavelength in a wavelength range of 500 nm to 600 nm and is circularly-polarized light and red light which has a light emission central wavelength in a wavelength range of 600 nm to 650 nm and is circularly-polarized light;

the polarization separating member includes a reflection polarizer that separates the unpolarized blue light entering the reflection polarizer in a normal direction to the polarization separating member into blue transmitted light that is one circularly-polarized light of right-circularly-polarized light and left-circularly-polarized light and blue reflected light that is the other circularly-polarized light, transmits at least some of the green light in a wavelength range of 500 nm to 600 nm, and transmits at least some of the red light in a wavelength range of 600 nm to 650 nm and a λ/4 plate that respectively converts the blue transmitted light that is circularly-polarized light, the green light that is circularly-polarized light, and the red light that is circularly-polarized light to blue light that is linearly-polarized light, green light that is linearly-polarized light, and red light that is linearly-polarized light in this order from a backlight side; and an absorption axis of the display-side polarizer is parallel to vibration directions of the blue light that is linearly-polarized light, the green light that is linearly-polarized light, and the red light that is linearly-polarized light.

The above-described constitution improves the front surface luminance of the liquid crystal display device of the present invention and also enables a decrease in the total thickness of members by means of a decrease in the number of the members. Since the polarization separating member capable of transmitting, out of unpolarized blue light, light circularly polarized in one direction and reflecting light circularly polarized in the other direction using a backlight of unpolarized blue light, the light conversion member including the circularly polarized luminescence fluorescent material that emits green circularly-polarized light and red circularly-polarized light when unpolarized blue light enters the fluorescent material, and the λ/4 plate capable of respectively converting blue circularly-polarized light, green circularly-polarized light, and red circularly-polarized light to linearly-polarized light are combined together, it is possible to increase the light utilization ratio by controlling absorption of backlight light on a backlight side of the liquid crystal cell.

In addition, since the transmission axis of the display-side polarizer is parallel to the vibration directions of the blue light, the green light, and the red light, it is possible to cause all of the blue light that is linearly-polarized light, the green light that is linearly-polarized light, and the red light that is linearly-polarized light, all of the blue light, the green light, and the red light, it is possible to cause all of the blue light that is linearly-polarized light, the green light that is linearly-polarized light, and the red light that is linearly-polarized light to enter the liquid crystal cell in similar polarization states even without the backlight-side polarizing plate.

First, the constitution of the liquid crystal display device of the present invention will be described using the accompanying drawings.

FIGS. 1 to 4 illustrate schematic views of the liquid crystal display device of the present invention.

A liquid crystal display device 51 of the present invention illustrated in FIG. 1 includes a backlight unit 31, a light conversion member 16, a selective reflection member 5, a liquid crystal cell 42, and a display-side polarizing plate 46.

The backlight unit 31 includes a blue light source 31A that emits unpolarized blue light having a light emission central wavelength in a wavelength range of 430 nm to 480 nm and a reflection member that converts, out of right-circularly-polarized light and left-circularly-polarized light in a wavelength range of 430 nm to 480 nm, one circularly-polarized light to unpolarized blue light and reflects the unpolarized blue light. The backlight unit 31 preferably includes a light guide plate 31B which serves as a surface light source, and the like.

The polarization separating member 5 includes a reflection polarizer 14 that separates unpolarized blue light 32 entering the reflection polarizer in a normal direction to the polarization separating member 5 into blue transmitted light that is one circularly-polarized light of right-circularly-polarized light and left-circularly-polarized light and blue reflected light that is the other circularly-polarized light, transmits at least some of the green light in a wavelength range of 500 nm to 600 nm, and transmits at least some of the red light in a wavelength range of 600 nm to 650 nm and a $\lambda/4$ plate 12 that respectively converts the blue transmitted light that is circularly-polarized light, the green light that is circularly-polarized light, and the red light that is circularly-polarized light to blue light that is linearly-polarized light, green light that is linearly-polarized light, and red light that is linearly-polarized light in this order from a backlight side.

Figure 2:
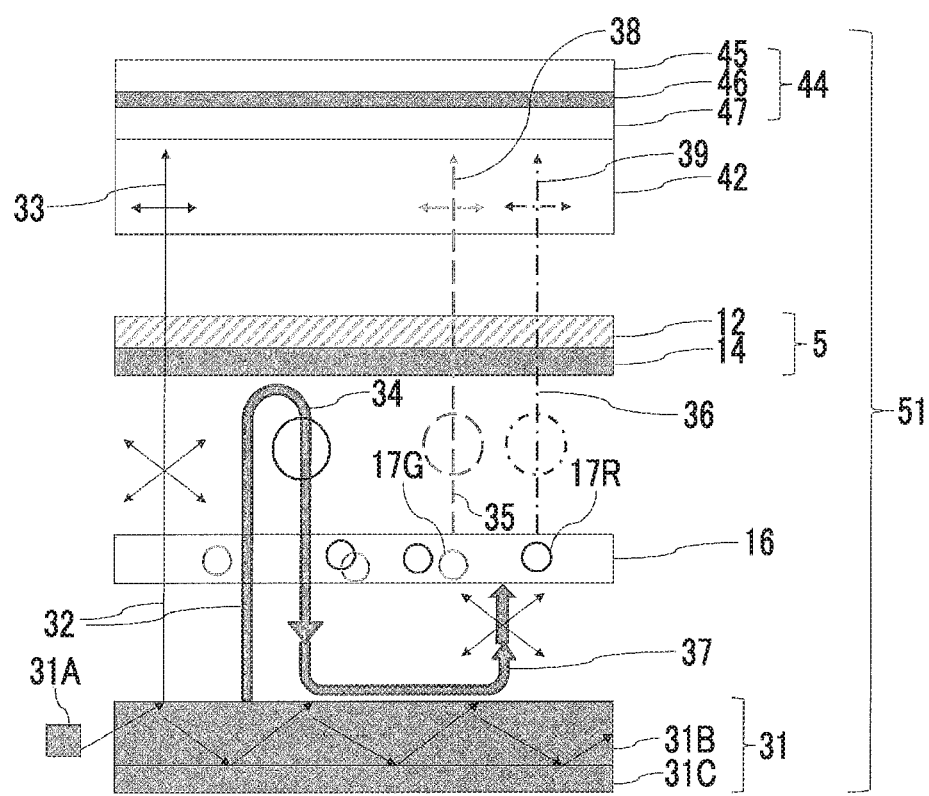
FIG. 2 is a schematic view illustrating a section of another example of the liquid crystal display device of the present invention in which a polarization separation member is not in contact with a liquid crystal cell.

The liquid crystal display device of the present invention may have a constitution in which a backlight-side polarizer 3 described below or a backlight-side polarizing plate 1 described below are not included as illustrated in FIG. 1 or 2. In this case, the liquid crystal cell 42 and the polarization separating member 5 may be laminated in direct contact with each other as illustrated in FIG. 1 or laminated through an adhesive layer, not illustrate, or the polarization separating member 5 may be disposed separate from the liquid crystal cell 42 (through an air layer) as illustrated in FIG. 2.

As a specific constitution of the polarization separating member 5, a constitution in which the reflection polarizer 14 and the $\lambda/4$ plate 12, which are illustrated in FIGS. 1 to 4, are provided in this order from the backlight side is preferred. As the reflection polarizer 14, it is possible to use a light reflection layer formed by fixing a cholesteric liquid crystalline phase. However, the polarization separating member 5 is not limited to the constitutions illustrated in FIGS. 1 to 4.

The $\lambda/4$ plate 12 is preferably disposed so that the angle formed between the slow axis of the $\lambda/4$ plate 12 and the absorption axis of the display-side polarizer 46 is 45° in order to respectively convert blue transmitted light that is circularly-polarized light, green light that is circularly-polarized light, and red light that is circularly-polarized light to blue light that is linearly-polarized light, green light that is linearly-polarized light, and red light that is linearly-polarized light.

In a constitution in which, as the polarization separating member 5, a light reflection layer formed by fixing a cholesteric liquid crystalline phase, which is the reflection polarizer 14, and the $\lambda/4$ plate 12 disposed so that the angle formed between the slow axis of the $\lambda/4$ plate 12 and the absorption axis of the display-side polarizer 46 is 45° are provided in this order from the backlight side, when the unpolarized blue light 32 entering the polarization separating member 5 passes through the light reflection layer formed by fixing a cholesteric liquid crystalline phase, which is the reflection polarizer 14, any one of right-circularly-polarized light and left-circularly-polarized light is reflected at the reflection central wavelength, and the other light is transmitted. Light circularly polarized in a direction different from the direction in which the light which has passed through the reflection polarizer 14 and has reflected by the light reflection layer formed by fixing a cholesteric liquid crystalline phase enters the $\lambda/4$ plate 12, is converted to linearly-polarized light due to the $\lambda/4$ plate 12, and travels as blue transmitted light (blue light that is linearly-polarized light transmitted through the polarization separating member) 33 from the polarization separating member 5 toward the liquid crystal cell 42 or the arbitrarily-provided backlight-side polarizing plate 1.

One circularly-polarized light of right-circularly-polarized light and left-circularly-polarized light which has been reflected by the light reflection layer formed by fixing a cholesteric liquid crystalline phase, which is the reflection polarizer 14, travels as blue reflected light (blue light that is circularly-polarized light reflected by the polarization separating member) 34 toward the light conversion member 16 or the backlight unit 31.

The blue reflected light 34 (blue light that is circularly-polarized light reflected by the polarization separating member) which has traveled toward the backlight unit 31 and has been reflected by the polarization separating member 5 is reflected or scattered by a reflection member 31C constituting the backlight unit 31 or interfaces of other arbitrary members, for example, a light guide plate 31B and travels toward the light conversion member 16 or the polarization separating member 5 as retroreflective unpolarized blue light 37.

Meanwhile, the light reflection layer formed by fixing a cholesteric liquid crystalline phase, which is the reflection polarizer 14, collectively transmits at least some of the green light in a wavelength range of 500 nm to 600 nm, specifically, the green light 35 that is circularly-polarized light emitted from a light conversion member described below and transmits at least some of the red light in a wavelength range of 600 nm to 650 nm, specifically, the red light 36 that is circularly-polarized light emitted from the light conversion member described below, and thus the green light 35 which has passed through the light reflection layer formed by fixing a cholesteric liquid crystalline phase, which is the reflection polarizer 14, and has been emitted from the light conversion member and the red light 36 that is circularly-polarized light emitted from the light conversion member travel toward the $\lambda/4$ plate 12. The green light 35 that is circularly-polarized light emitted from the light conversion member and the red light 36 that is circularly-polarized light emitted from the light conversion member are respectively converted to linearly-polarized light due to the $\lambda/4$ plate 12 and travels as green light that is linearly-polarized light (green light that is linearly-polarized light transmitted through the polarization separating member) 38 and red light that is linearly-polarized light (red light that is linearly-polarized light transmitted through the polarization separating member) 39 from the polarization separating member 5 toward the liquid crystal cell 42 or the arbitrarily-provided backlight-side polarizing plate 1.

The light conversion member 16 includes circularly polarized luminescence fluorescent materials 17G and 17R that, due to unpolarized blue light entering the light conversion member 16, respectively emit green light 35 which has a light emission central wavelength in a wavelength range of 500 nm to 600 nm and is circularly-polarized light and red light 36 which has a light emission central wavelength in a wavelength range of 600 nm to 650 nm and is circularly-polarized light.

Examples of the unpolarized blue light entering the light conversion member 16 include unpolarized blue light 32 that is incidence ray from the backlight unit; and blue light 37 retroreflected by the reflection member 31C constituting the backlight unit 31 and other arbitrary members.

Meanwhile, the circularly polarized luminescence fluorescent materials 17G and 17R in the light conversion member 16 may be excited by blue reflected light (blue light that is circularly-polarized light reflected by the polarization separating member) 34 and respectively fluorescently emit the green light 35 that is circularly-polarized light and the red light 36 that is circularly-polarized light.

Figure 3:
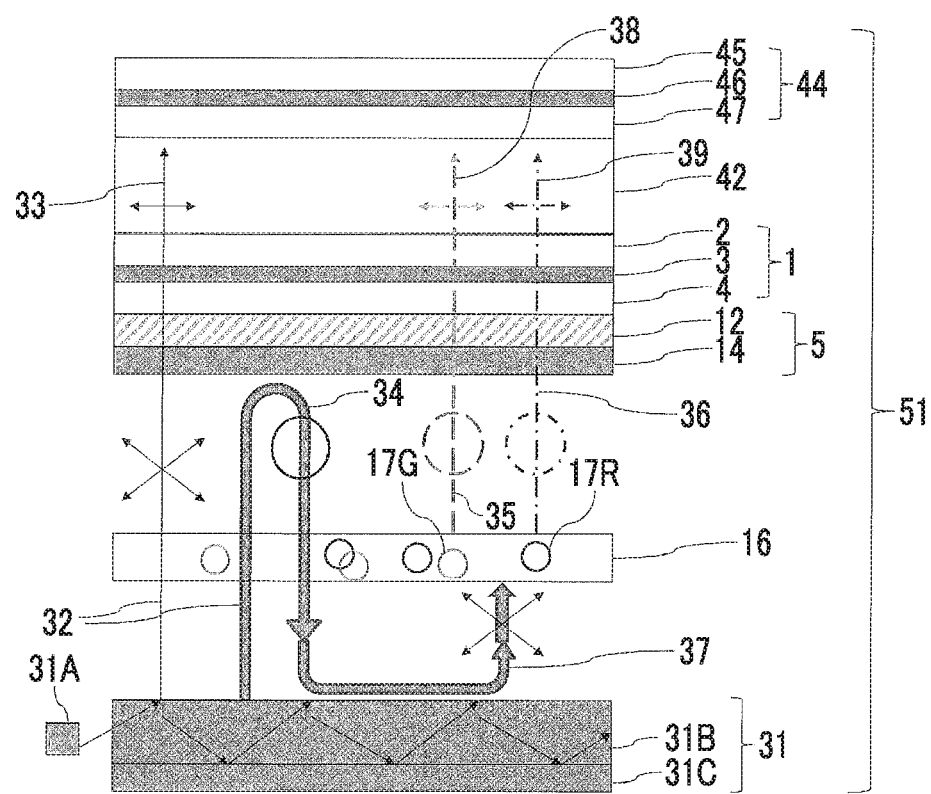
FIG. 3 is a schematic view illustrating a section of still another example of the liquid crystal display device of the present invention in which a backlight-side polarizer is provided, and the polarization separation member is in contact with the backlight-side polarizer.
Figure 4:
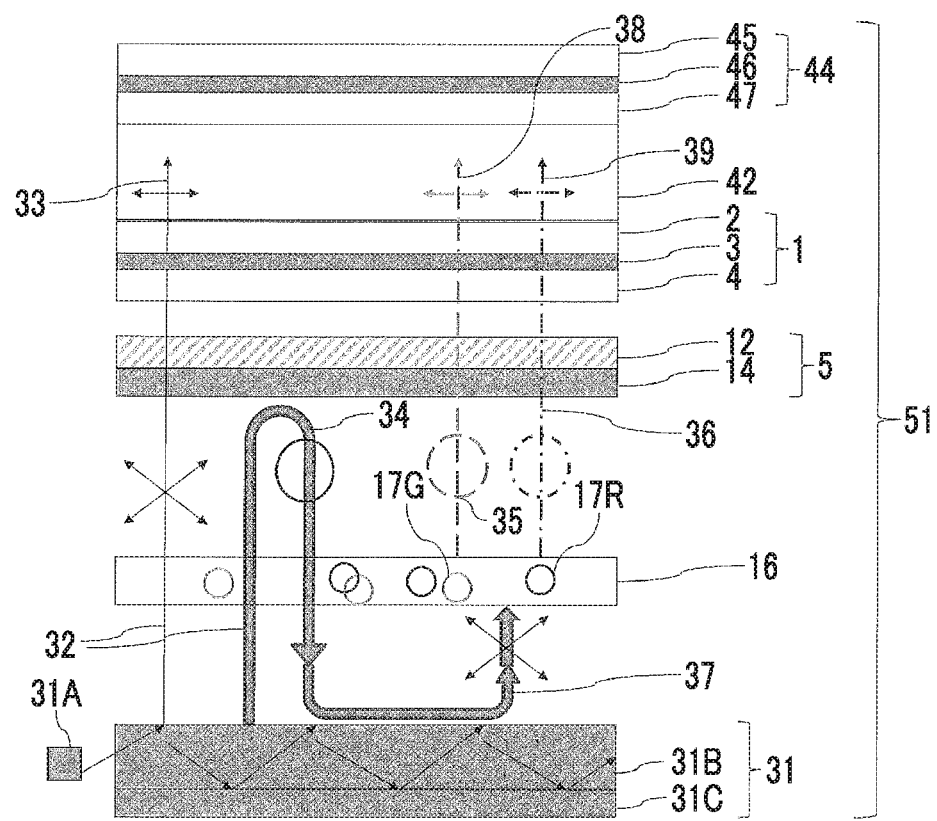
FIG. 4 is a schematic view illustrating a section of still another example of the liquid crystal display device of the present invention in which the backlight-side polarizer is provided, and the polarization separation member is not in contact with the backlight-side polarizer.

The backlight-side polarizer 3 illustrated in FIGS. 3 and 4 which may be arbitrarily provided is preferably disposed so that the transmission axis (not illustrated) of the backlight-side polarizer 3 becomes parallel to the vibration direction of the blue transmitted light (blue light that is linearly-polarized light transmitted through the polarization separation member) 33, the green light that is linearly-polarized light (green light that is linearly-polarized light transmitted through the polarization separation member) 38, and the red light that is linearly-polarized light (red light that is linearly-polarized light transmitted through the polarization separation member) 39. In addition, it is preferable that the backlight-side polarizer 3 is orthogonal to the absorption axis of the display-side polarizer 46, that is, the backlight-side polarizer 3 is orthogonal to the transmission axis of the display-side polarizer 46.

The backlight-side polarizer 3 having a polarizing plate protective film laminated and disposed on at least any one of the surfaces thereof is called a backlight-side polarizing plate 1. The constitution of the backlight-side polarizing plate is not particularly limited, a well-known constitution can be employed, and it is possible to employ a constitution of a laminate including a polarizing plate protective film (inner side) 2, the polarizer 3, and a polarizing plate protective film (outer side) 4. In addition, it is also possible to employ, for example, an inner component-free constitution in which the polarizing plate protective film is not provided on the inner side and an adhesive or a coated film is directly provided on the polarizer. Furthermore, as the polarizing plate protective film on the outer side or instead of the polarizing plate protective film 4 on the outer side, the polarization separation member 5 can be used. That is, it is possible to use the polarization separation member 5 as the polarization plate protective film 4 on the outer side which is included in the backlight-side polarizing plate.

In the liquid crystal display device 51 of the present invention, the polarization separation member 5 and the backlight-side polarizer 3 may be disposed adjacent to each other directly or through an adhesive, not illustrated, or the polarizing plate protective film 4 on the outer side (refer to FIG. 3) or may be disposed separate from each other through an air layer (refer to FIG. 4). In the liquid crystal display device 51 of the present invention, the polarization separation member 5 and the backlight-side polarizer 1 are preferably disposed adjacent to each other through the polarizing plate protective film 4 on the outer side since it becomes easy to accurately control the optical performance of the polarization separation member 5, the luminance is further improved by improving the light utilization efficiency of the unpolarized blue light 32 emitted from the backlight unit or the retroreflective unpolarized blue light 37, or light leakage of ultraviolet light or blue light having a short wavelength is suppressed.

The display-side polarizer 46 illustrated in FIGS. 1 to 4 is disposed so that the absorption axis of the display-side polarizer 46 is parallel to the vibration direction of the blue transmitted light (blue light that is linearly-polarized light transmitted through the polarization separation member) 33, the green light 38 that is linearly-polarized light, and the red light 39 that is linearly-polarized light.

That is, the blue transmitted light 33, the green light 38 that is linearly-polarized light, and the red light 39 that is linearly-polarized light have the same vibration direction.

The display-side polarizing plate 44 including the display-side polarizer 46 is not particularly limited, a well-known constitution can be employed, and it is possible to use, for example, a constitution of a laminate of the polarizing plate protective film (outer side) 45, the display-side polarizer 46, and the polarizing plate protective film (inner side) 47 as illustrated in FIGS. 1 to 4.

In the liquid crystal display device 51 of the present invention, a luminance-improving film, not illustrated, may be further disposed between the light conversion member 16 and the polarization separation member 5, and examples of the luminance-improving film include a well-known prism sheet and a diffusion plate. However, in the liquid crystal display device of the present invention, the disposition position of the luminance-improving film is not limited, and the luminance-improving film may be disposed between the light conversion member 16 and the backlight unit 31.

Next, regarding the respective members constituting the liquid crystal display device of the present invention, a preferred aspect will be described.

<Backlight unit>

In the liquid crystal display device of the present invention, the backlight unit includes a light source that emits unpolarized light having a light emission central wavelength in a wavelength range of 430 nm to 480 nm and a reflection member that converts one circularly-polarized light of right-circularly-polarized light and left-circularly-polarized light in a wavelength range of 430 nm to 480 nm to unpolarized blue light and reflects the unpolarized blue light.

A backlight may be either an edge light mode having a light guide plate, a reflection plate, or the like as a constitutional member or a direct backlight mode; however, in the liquid crystal display device of the present invention, the entire backlight unit is preferably a surface light source.

In a case in which the backlight unit is a light source or an edge light mode, the liquid crystal display device of the present invention includes a reflection member that reflects (repeatedly reflects) light which has been emitted from the light source and reflected by the polarization separation member in the rear portion of the light guide plate. The reflection member is capable of improving the brightness of the liquid crystal display device and randomizes the direction and the polarization state of light which is emitted from the light source and is reflected by the selective reflection member and recirculates the light. The above-described reflection member is not particularly limited, and a well-known reflection member can be used. The reflection member is described in JP3416302B, JP3363565B, JP4091978B, JP3448626B, and the like, the contents of which are incorporated into the present invention.

In the liquid crystal display device of the present invention, the light source of the backlight unit preferably includes a blue light-emitting diode that emits light having a light emission central wavelength in a wavelength range of 430 nm to 480 nm.

The backlight unit preferably includes, additionally, a well-known diffusion plate, a well-known diffusion sheet, and a well-known prism sheet (for example, BEF or the like). These additional members are also described in JP3416302B, JP3363565B, JP4091978B, JP3448626B, and the like, the contents of which are incorporated into the present invention.

In the liquid crystal display device of the present invention, the unpolarized blue light emitted from the backlight unit preferably has a light emission central wavelength in a wavelength range of 440 nm to 460 nm.

In the liquid crystal display device of the present invention, all of the green light that is circularly-polarized light and the red light that is circularly-polarized light which are emitted from the light conversion member preferably have a peak with a light emission intensity having a half bandwidth of 100 nm or smaller, more preferably have a peak with a light emission intensity having a half bandwidth of 80 nm or smaller, and particularly preferably have a peak with a light emission intensity having a half bandwidth of 70 nm or smaller.

In the liquid crystal display device of the present invention, the difference between the light emission central wavelength of the unpolarized blue light emitted from the backlight unit and the reflection central wavelength of the reflection polarizer included in the polarization separating member preferably is 50 nm or lower (both central wavelengths preferably coincide with each other). Specifically, the difference between the light emission central wavelength of the unpolarized blue light emitted from the backlight unit and the reflection central wavelength of the light reflection layer formed by fixing a cholesteric liquid crystalline phase, which is used as the reflection polarizer, is preferably 50 nm or lower. It is particularly preferable that the light emission central wavelength of unpolarized blue light emitted from the backlight unit is in a wavelength range of 440 nm to 460 nm, the reflection central wavelength of the light reflection layer formed by fixing a cholesteric liquid crystalline phase is in a wavelength range of 440 nm to 460 nm, and the difference between the light emission central wavelength of the unpolarized blue light emitted from the backlight unit and the reflection central wavelength of the light reflection layer formed by fixing a cholesteric liquid crystalline phase preferably is 50 nm or lower. In the present specification, two wavelengths "coinciding with each other" means not only a case in which two wavelengths completely coincide with each other but also a case in which two wavelengths differ from each other within an optically acceptable range. The difference between the light emission central wavelength of the unpolarized blue light emitted from the backlight unit and the reflection central wavelength of the reflection polarizer included in the polarization separating member is preferably 50 nm or smaller, more preferably 20 nm or smaller, and particularly preferably 10 nm or smaller. In addition, in the present specification, the light emission central wavelength refers to a wavelength at which the peak of the spectrum of the light emission intensity reaches the maximum. In addition, in the present specification, the reflection central wavelength refers to a wavelength at which the peak of the spectrum of the resistivity reaches the maximum.

<Light conversion member>

The liquid crystal display device of the present invention includes the light conversion member, and the light conversion member includes a circularly polarized luminescence fluorescent material that, due to unpolarized blue light entering the light conversion member, emits green light which has a light emission central wavelength in a wavelength range of 500 nm to 600 nm and is circularly-polarized light and red light which has a light emission central wavelength in a wavelength range of 600 nm to 650 nm and is circularly-polarized light.

The polarization state of light emitted from the light conversion member can be measured by measuring polarized light using, for example, an Axoscan manufactured by Axometrics, Inc.

The number of the circularly polarized luminescence fluorescent materials included in the light conversion member may be one or more, but at least a circularly polarized luminescence fluorescent material that, due to unpolarized blue light entering the light conversion member, emits green light which has a light emission central wavelength in a wavelength range of 500 nm to 600 nm and is circularly-polarized light and a circularly polarized luminescence fluorescent material that, due to unpolarized blue light entering the light conversion member, red light which has a light emission central wavelength in a wavelength range of 600 nm to 650 nm and is circularly-polarized light are preferably included.

In the liquid crystal display device of the present invention, both of the green light that is circularly-polarized light and the red light that is circularly-polarized light, which are emitted from the light conversion member, preferably have a peak with a light emission intensity having a half bandwidth of 100 nm or smaller, more preferably have a peak with a light emission intensity having a half bandwidth of 80 nm or smaller, and particularly preferably have a peak with a light emission intensity having a half bandwidth of 70 nm or smaller.

The circularly polarized luminescence fluorescent material is not particularly limited, and a well-known fluorescent material can be used. For example, it is possible to use a compound semiconductor synthesized in a spherical shell-like protein ferritin (basket-like protein) in charge of the storage and control of iron ions in a live body. It is known that, when crystals in the compound semiconductor grow, the dextral stereoscopic structure of a molecule of the protein is transferred to the compound semiconductor using the molecular structure of the protein including alpha helix properties (right-handed helix structure) constituting the inner wall of ferritin as a base, and thus, a quantum dot of the compound semiconductor exhibiting circularly polarized luminescence properties is obtained.

Circularly polarized luminescence (CPL) indicates the difference in the intensity of light emission between right-circularly-polarized light and left-circularly-polarized light emitted from an optical active molecule.

As a substance exhibiting circularly polarized luminescence (CPL), bioluminescence, luminescent rare earthes, optical active conjugated polymers, and the like are known. In addition, there is a report that, in the compound semiconductor, GaAs or the like exhibits circularly polarized luminescence when excited using a circular polarization laser. Compound semiconductor fine nanoparticles are described in JP2009-242501A, specifically, it is disclosed in the examples that CdS adjusted in the core of ferritin, which is basket-like protein, exhibits strong circularly polarized luminescence (CPL), and the content thereof is incorporated into the present invention.

The basket-like protein is preferably apoferritin obtained by removing the core of a metallic oxide from ferritin, and, in a case in which protein is chemically modified on the surfaces of the compound semiconductor fine nanoparticles, arbitrary protein may be used.

Ferritin has a structure including a spherical protein outer shell portion having a diameter of 12 nm which is made up of 24 protein monomers and a core portion having a diameter of approximately 6 nm which is a core portion of the outer shell portion and absorbs an Fe ion in a body and stores the Fe ion in an oxide form. Apoferritin is also capable of storing fine particles made of a variety of metals, other than Fe, such as nickel (Ni), cobalt (Co), and manganese (Mn) in the core. Ferritin is capable of producing fine nanoparticles of a compound semiconductor made up of two or more elements in the core portion. Meanwhile, according to JP2009-242501A, when the circularly polarized luminescence fluorescent material is produced using a basket-like protein also as a reaction field for formation of fine particles, circularly polarized luminescence is exhibited due to an effect of an asymmetry field in the basket-like protein (apoferritin).

Ferritin has a self-assembly function and thus easily forms a uniform film, and protein in the outer shell is easily decomposed and removed by means of a UV ozone thermal treatment or the like. When the adsorption location on a semiconductor substrate of ferritin is controlled using the self-assembly function of ferritin, and the outer shell protein of ferritin is selectively removed, it is possible to produce a structure in which a metal oxide, which is the core, is arranged in a two-dimensional matrix shape. That is, in the basket-shaped protein, apoferritin has a self-assembly function and thus has advantages that apoferritin can be disposed in a high density, the protein of ferritin has an almost uniform shape or size, and furthermore, a convenient production process enables a decrease in the manufacturing costs, which is preferable. In addition, in a case in which apoferritin is used, the diameter of the internal space thereof is approximately 7 nm or smaller, and it is possible to efficiently produce compound semiconductor fine nanoparticles in a nanometer-order size, which is preferable.

In a case in which the basket-like protein is apoferritin, a compound semiconductor used as compound semiconductor particles is preferably a II-VI-type compound semiconductor and particularly preferably CdS, ZnS, or InP.

Even in a case in which protein is chemically modified on the surfaces of the compound semiconductor fine nanoparticles, similar to the compound semiconductor fine nanoparticles synthesized in ferritin, compound semiconductor fine nanoparticles exhibit circularly polarized luminescence due to an effect of an asymmetric field.

In a case in which a circularly polarized luminescence fluorescent material made of compound semiconductor fine nanoparticles having a surface modified with protein is used, the compound semiconductor used as the compound semiconductor particles is preferably a II-VI-type compound semiconductor or a III-V-type compound semiconductor.

The fluorescent wavelength of the circularly polarized luminescence fluorescent material can be controlled by changing the particle diameter of a fluorescent body.

In addition, the circularly polarized luminescence wavelength may also be controlled by irradiating the circularly polarized luminescence fluorescent material with a laser. Regarding the adjustment of the circularly polarized luminescence fluorescent wavelength, when the circularly polarized luminescence fluorescent material including the compound semiconductor fine nanoparticles is irradiated with a laser, the compound semiconductor fine nanoparticles in the circularly polarized luminescence fluorescent material cause a photo-oxidation reaction and, consequently, the wavelength shifts toward a longer wavelength side. When the above-described method for controlling the wavelength of the circularly polarized luminescence fluorescent material is used, it is possible to shift the circularly polarized luminescence fluorescent wavelength of the circularly polarized luminescence fluorescent material toward a longer wavelength side. Meanwhile, it is also possible to shift the fluorescent wavelength toward a longer wavelength side by irradiating the circularly polarized luminescence fine nanoparticles with a laser.

The light conversion member including the circularly polarized luminescence fluorescent material is preferably a film including the circularly polarized luminescence fluorescent material or an adhesive layer in which the circularly polarized luminescence fluorescent material is dispersed. As the light conversion member including the circularly polarized luminescence fluorescent material, it is also possible to use a thermoplastic film obtained by dispersing the circularly polarized luminescence fluorescent material in the film and then stretching the film.

<Polarization separating member>

In the liquid crystal display device of the present invention, the polarization separating member includes a reflection polarizer that separates the unpolarized blue light entering the reflection polarizer in a normal direction to the polarization separating member into blue transmitted light that is one circularly-polarized light of right-circularly-polarized light and left-circularly-polarized light and blue reflected light that is the other circularly-polarized light, transmits at least some of the green light in a wavelength range of 500 nm to 600 nm, and transmits at least some of the red light in a wavelength range of 600 nm to 650 nm and λ/4 plate that respectively converts the blue transmitted light that is circularly-polarized light, the green light that is circularly-polarized light, and the red light that is circularly-polarized light to blue light that is linearly-polarized light, green light that is linearly-polarized light, and red light that is linearly-polarized light in this order from a backlight side.

(Reflection polarizer)

The reflection polarizer separates unpolarized blue light entering the reflection polarizer in the normal direction to the polarization separating member into blue transmitted light that is one circularly-polarized light of right-circularly-polarized light and left-circularly-polarized light and blue reflected light that is the other circularly-polarized light, transmits at least some of the green light in a wavelength range of 500 nm to 600 nm, and transmits at least some of the red light in a wavelength range of 600 nm to 650 nm.

That is, it is preferable that the reflection polarizer selectively exhibits a reflection function with respect to unpolarized blue light having a light emission central wavelength in a wavelength range of 430 nm to 480 nm which is emitted from the backlight unit or light retroreflected by the backlight unit, does not exhibit a reflection function with respect to at least some of the light in a wavelength range of 500 nm to 600 nm, and does not exhibit a reflection function with respect to at least some of the light in a wavelength range of 600 nm to 650 nm.

The reflection polarizer preferably has a reflection central wavelength in a wavelength range of 430 nm to 480 nm and more preferably has a reflection central wavelength in a wavelength range of 440 nm to 460 nm.

The peak of the reflection ratio having a reflection central wavelength in a wavelength range of 430 nm to 480 nm is preferably a peak of the reflection ratio having a half bandwidth of 100 nm or smaller, more preferably a peak of the reflection ratio having a half bandwidth of 80 nm or smaller, particularly preferably a peak of the reflection ratio having a half bandwidth of 70 nm or smaller, more particularly preferably a peak of the reflection ratio having a half bandwidth of 20 nm or smaller, and still more particularly preferably a peak of the reflection ratio having a half bandwidth of 10 nm or smaller.

The reflection polarizer transmitting at least some of the green light in a wavelength range of 500 nm to 600 nm and transmitting at least some of the red light in a wavelength range of 600 nm to 650 nm is not limited to an aspect in which the transmission ratio is 100% in the entire wavelength range of 500 nm to 600 nm and 600 nm to 650 nm, and the transmission ratio may be high enough to be optically accepted in the liquid crystal display device at a desired wavelength in a wavelength range of 500 nm to 600 nm and 600 nm to 650 nm. For example, the reflection polarizer preferably does not have any peaks of the reflection ratio in the visible light range other than the peak of the reflection ratio in a wavelength range of 430 nm to 480 nm.

Specifically, the reflection polarizer preferably transmits at least some of the blue light which is emitted from the light conversion member, has a light emission central wavelength in a wavelength range of 430 nm to 480 nm, and is light linearly polarized in the vibration direction parallel to the absorption axis of the display-side polarizer, more preferably transmits light having the light emission central wavelength of the blue light, and particularly preferably transmits all of the light emission peaks of the blue light. In the reflection polarizer, the peak of the maximum reflection ratio in a wavelength range of 430 nm to 480 nm is preferably 20% or lower, the peak of the maximum reflection ratio in a wavelength range of 430 nm to 480 nm is more preferably 10% or lower, and the peak of the maximum reflection ratio in a wavelength range of 430 nm to 480 nm is particularly preferably 5% or lower.

In addition, the reflection polarizer preferably transmits at least some of the green light which is emitted from the light conversion member, has a light emission central wavelength in a wavelength range of 500 nm to 600 nm, and is circularly-polarized light, more preferably transmits light having the light emission central wavelength of the green light, and particularly preferably transmits all of the light emission peaks of the green light. In the reflection polarizer member, the peak of the maximum reflection ratio in a wavelength range of 500 nm to 600 nm is preferably 20% or lower, the peak of the maximum reflection ratio in a wavelength range of 500 nm to 600 nm is more preferably 10% or lower, and the peak of the maximum reflection ratio in a wavelength range of 500 nm to 600 nm is particularly preferably 5% or lower.

The reflection polarizer preferably transmits at least some of the red light which is emitted from the light conversion member, has a light emission central wavelength in a wavelength range of 600 nm to 650 nm, and is circularly-polarized light, more preferably transmits light having the light emission central wavelength of the green light, and particularly preferably transmits all of the light emission peaks of the green light. In the reflection polarizer, the peak of the maximum reflection ratio in a wavelength range of 600 nm to 650 nm is preferably 20% or lower, the peak of the maximum reflection ratio in a wavelength range of 600 nm to 650 nm is more preferably 10% or lower, and the peak of the maximum reflection ratio in a wavelength range of 600 nm to 650 nm is particularly preferably 5% or lower.

In the reflection polarizer, the polarization state of light in a wavelength of 500 nm to 600 nm, which enters the reflection polarizer, and the polarization state of light in a wavelength of 500 nm to 600 nm, which is emitted from the reflection polarizer, are preferably substantially the same as each other, and specifically, the direction of circularly polarized light in a wavelength of 500 nm to 600 nm, which enters the reflection polarizer, and the direction of circularly polarized light in a wavelength of 500 nm to 600 nm, which is emitted from the reflection polarizer, are preferably the same as each other.

In the reflection polarizer, the polarization state of light in a wavelength of 600 nm to 650 nm, which enters the reflection polarizer, and the polarization state of light in a wavelength of 600 nm to 650 nm, which is emitted from the reflection polarizer, are preferably substantially the same as each other, and specifically, the direction of circularly polarized light in a wavelength of 600 nm to 650 nm, which enters the reflection polarizer, and the direction of circularly polarized light in a wavelength of 600 nm to 650 nm, which is emitted from the reflection polarizer, are preferably the same as each other.

The total film thickness of the polarization separating member is preferably in a range of 1 μm to 130 μm, more preferably in a range of 1 μm to 70 μm, particularly preferably in a range of 1 μm to 10 μm, and more particularly preferably in a range of 1 μm to 8 μm.

—Light Reflection Layer Formed by Fixing Cholesteric Liquid Crystalline Phase—

In the liquid crystal display device of the present invention, it is preferable that the reflection polarizer is a light reflection layer formed by fixing a cholesteric liquid crystalline phase, and the light reflection layer formed by fixing a cholesteric liquid crystalline phase has a reflection central wavelength in a wavelength range of 430 nm to 480 nm, reflects any one of right-circularly-polarized light and left-circularly-polarized light at the reflection central wavelength, transmits the other light, transmits at least some of the green light in a wavelength range of 500 nm to 600 nm, and transmits at least some of the red light in a wavelength range of 600 nm to 650 nm.

With respect to unpolarized light in a wavelength range of 430 nm to 480 nm which enters the light reflection layer formed by fixing a cholesteric liquid crystalline phase, the light reflection layer formed by fixing a cholesteric liquid crystalline phase reflects or transmits (emits) any one of right-circularly-polarized light and left-circularly-polarized light. A light reflection layer formed by fixing a cholesteric liquid crystalline phase which has a reflection spectrum in which one peak of the reflection ratio with the flat maximum value and a steep rise appears at an almost constant wavelength in a certain wavelength range (for example, 440 nm to 460 nm) in a wavelength range of 430 nm to 480 nm and the reflection ratio is 0% at the other wavelengths (for example, 430 nm to lower than 440 nm or higher than 460 nm to 480 nm) is also included in the scope of the aspect.

The total film thickness of all of the light reflection layers formed by fixing a cholesteric liquid crystalline phase including the light reflection layer formed by fixing the cholesteric liquid crystalline phase is preferably in a range of 2 μm to 12 μm, more preferably in a range of 2 μm to 5 μm, and particularly preferably in a range of 2 μm to 4 μm.

Two or more light reflection layers formed by fixing a cholesteric liquid crystalline phase may be combined together; however, from the viewpoint of decreasing the total film thickness of the polarization separation member, it is preferable to use only the light reflection layer formed by fixing the cholesteric liquid crystalline phase, and the light reflection layer preferably does not include any other layers formed by fixing a cholesteric liquid crystalline phase.

The reflection central wavelength, that is, a wavelength at which the peak of the reflection ratio is generated can be adjusted to be a desired value by changing the pitch or refractive index of the light reflection layer formed by fixing a cholesteric liquid crystalline phase, and the change in the pitch can be easily adjusted to be a desired value by changing the amount of a chiral agent added. Specifically, what has been described above is described in detail on pp. 60 to 63 of Fujifilm Research & Development No. 50 (2005).

A method for laminating the light reflection layer formed by fixing the cholesteric liquid crystalline phase which has a reflection central wavelength in a wavelength range of 430 nm to 480 nm is not particularly limited. For example, it is possible to produce the light reflection member of the present invention by applying a light reflection layer formed by fixing a cholesteric liquid crystalline phase for which a counter-clockwise turning chiral agent is used or a light reflection layer formed by fixing a cholesteric liquid crystalline phase for which a clockwise turning chiral agent is used and, as necessary, drying and curing the laminate.

The method for manufacturing the light reflection layer formed by fixing a cholesteric liquid crystalline phase is not particularly limited, and it is possible to use, for example, the methods described in JP1989-133003A (JP-H1-133003A), JP3416302B, JP3363565B, and JP1996-271731A (JP-H8-271731A), the contents of which are incorporated into the present invention.

Hereinafter, the method described in JP1996-271731A (JP-H8-271731A) will be described.

As the cholesteric liquid crystal, an appropriate liquid crystal may be used and there is no particular limitation. A liquid crystal polymer is preferably used in terms of the superimposition efficiency of a liquid crystal layer, the reduction of the thickness, and the like. In addition, the cholesteric liquid crystalline molecule preferably has a greater birefringence since the wavelength range of selective reflection widens.

As the liquid crystal polymer, for example, an appropriate liquid crystal polymer such as a main chain-type liquid crystal polymer such as a polyester, a side chain-type liquid crystal polymer made of an acrylic main chain, a methacrylic main chain, or a siloxane main chain, a low molecular chiral agent-containing nematic liquid crystal polymer, a chiral component-introduced liquid crystal polymer, or a mixed liquid crystal polymer of a nematic-based liquid crystal polymer and a cholesteric-based liquid crystal polymer can be used. In terms of operability and the like, a liquid crystal polymer having a glass transition temperature in a range of 30° C. to 150° C. is preferred.

The light reflection layer formed by fixing a cholesteric liquid crystalline phase can be formed using an appropriate method such as a method in which the cholesteric liquid crystalline phase is directly applied to a support through an appropriate alignment film such as a polyimide, a polyvinyl alcohol, or an oblique evaporation layer of SiO as necessary or a method in which the cholesteric liquid crystalline phase is applied to a support that does not transform at the alignment temperature of the liquid crystal polymer made of a transparent film or the like through an alignment film as necessary. As the support, a support having a small phase difference as possible can be preferably used in terms of preventing a change in the state of polarization. In addition, a method of superimposing light reflection layers formed by fixing a cholesteric liquid crystalline phase through an alignment film or the like can be employed.

Meanwhile, the liquid crystal polymer can be applied using a method in which the liquid crystal polymer turned into a liquid phase such as a solution obtained using a solvent or a molten liquid obtained through heating is developed using an appropriate method such as a roll coating method, a gravure printing method, or a spin coating method. The thickness of the light reflection layer formed by fixing a cholesteric liquid crystal layer to be formed is preferably in a range of 0.5 μm to 100 μm in terms of preventing selective reflectiveness, disturbed alignment, or a decrease in transmittance.

(λ/4 Plate)

The polarization separating member includes a λ/4 plate that respectively converts the blue transmitted light that is circularly-polarized light, the green light that is circularly-polarized light, and the red light that is circularly-polarized light to blue light that is linearly-polarized light, green light that is linearly-polarized light, and red light that is linearly-polarized light.

In the polarization separating member, the angle formed between the slow axis of the λ/4 plate and the absorption axis of the display-side polarizer is preferably 45°.

In addition, the λ/4 plate preferably satisfies Expressions (1) to (3) below.

$$Re(\lambda)=\lambda/4\pm10 \text{ nm} \quad \text{Expression (1)}$$

(In Expression (1), λ represents the light emission central wavelength (unit: nm) of blue light that is circularly-polarized light, and Re (λ) represents a retardation (unit: nm) in the in-plane direction at a wavelength of λ nm.)

$$Re(\lambda)=\lambda/4\pm10 \text{ nm} \quad \text{Expression (2)}$$

(In Expression (2), λ represents the light emission central wavelength (unit: nm) of green light that is circularly-polarized light, and Re (λ) represents a retardation (unit: nm) in the in-plane direction at a wavelength of λ nm.)

$$Re(\lambda)=\lambda/4\pm10 \text{ nm} \quad \text{Expression (3)}$$

(In Expression (3), λ represents the light emission central wavelength (unit: nm) of red light that is circularly-polarized light, and Re (λ) represents a retardation (unit: nm) in the in-plane direction at a wavelength of λ nm.)

In addition, the λ/4 plate preferably satisfies Expressions (1') to (3') below.

$$Re(\lambda)=\lambda/4\pm5 \text{ nm} \quad \text{Expression (1')}$$

(In Expression (1'), λ represents the light emission central wavelength (unit: nm) of blue light that is circularly-polarized light, and Re (λ) represents a retardation (unit: nm) in the in-plane direction at a wavelength of λ nm.)

$$Re(\lambda)=\lambda/4\pm5 \text{ nm} \quad \text{Expression (2')}$$

(In Expression (2'), λ represents the light emission central wavelength (unit: nm) of green light that is circularly-polarized light, and Re (λ) represents a retardation (unit: nm) in the in-plane direction at a wavelength of λ nm.)

$$Re(\lambda)=\lambda/4\pm5 \text{ nm} \quad \text{Expression (3')}$$

(In Expression (3'), λ represents the light emission central wavelength (unit: nm) of red light that is circularly-polarized light, and Re (λ) represents a retardation (unit: nm) in the in-plane direction at a wavelength of λ nm.)

The λ/4 plate more preferably further satisfies Expression (2A) below, and the λ/4 plate particularly preferably further satisfies Expressions (1A), (3A), and (4A) below.

$$450 \text{ nm}/4-25 \text{ nm}<Re(450)<450 \text{ nm}/4+25 \text{ nm} \quad \text{Expression (1A)}$$

$$550 \text{ nm}/4-25 \text{ nm}<Re(550)<550 \text{ nm}/4+25 \text{ nm} \quad \text{Expression (2A)}$$

$$630 \text{ nm}/4-25 \text{ nm}<Re(630)<630 \text{ nm}/4+25 \text{ nm} \quad \text{Expression (3A)}$$

$$Re(450)<Re(550)<Re(630) \quad \text{Expression (4A)}$$

(In Expressions (1A) to (4), Re (λ) represents a retardation (unit: nm) in the in-plane direction at a wavelength of λ nm.)

The λ/4 plate may be a single layer or a laminate of two or more layers and is preferably a laminate of two or more layers.

The λ/4 plate is a layer for converting circularly-polarized light that has passed through the reflection layer to linearly-polarized light. At the same time, it becomes possible to cancel the phase difference in a positive thickness direction which is generated when seen in an inclined direction by adjusting the retardation (Rth) in the thickness direction.

Therefore, the retardation (Rth) of the λ/4 plate in the thickness direction is preferably a value close to zero and more preferably a negative value.

The λ/4 plate more preferably satisfies Expressions (1A') to (4A') below.

$$450 \text{ nm}/4 - 15 \text{ nm} < Re(450) < 450 \text{ nm}/4 + 15 \text{ nm} \quad \text{Expression (1A')}$$

$$550 \text{ nm}/4 - 15 \text{ nm} < Re(550) < 550 \text{ nm}/4 + 15 \text{ nm} \quad \text{Expression (2A')}$$

$$630 \text{ nm}/4 - 15 \text{ nm} < Re(630) < 630 \text{ nm}/4 + 15 \text{ nm} \quad \text{Expression (3A')}$$

$$Re(450) < Re(550) < Re(630) \quad \text{Expression (4A')}$$

The λ/4 plate more preferably satisfies Expressions (1A") to (4A") below.

$$450 \text{ nm}/4 - 5 \text{ nm} < Re(450) < 450 \text{ nm}/4 + 5 \text{ nm} \quad \text{Expression (1A")}$$

$$550 \text{ nm}/4 - 5 \text{ nm} < Re(450) < 450 \text{ nm}/4 + 5 \text{ nm} \quad \text{Expression (2A")}$$

$$630 \text{ nm}/4 - 5 \text{ nm} < Re(630) < 630 \text{ nm}/4 + 5 \text{ nm} \quad \text{Expression (3A")}$$

$$Re(450) < Re(550) < Re(630) \quad \text{Expression (4A")}$$

A method for manufacturing the λ/4 plate is not particularly limited, and it is possible to use, for example, the method described in JP1996-271731A (JP-118-271731A), the content thereof is incorporated into the present invention.

Hereinafter, the method described in JP1996-271731A (JP-H8-271731A) will be described.

Examples of the 1/4 wavelength plate made of a superimposed body of retardation films include a plurality of retardation films laminated together by combining a retardation film in which a 1/2 wavelength-phase difference is provided to monochromatic light and a retardation film in which a 1/4 wavelength-phase difference is provided to monochromatic light so that optical axes thereof cross each other.

In the above-described case, when a plurality of retardation films in which a 1/2 wavelength-phase difference or a 1/4 wavelength-phase difference is provided to monochromatic light are laminated so that optical axes thereof cross each other, it is possible to arbitrarily control the wavelength dispersion of retardation, which is defined as the product (Δnd) between the refractive index difference (Δn) and the thickness (d) of birefringent light by means of superimposition, addition, or subtraction and to produce a wavelength plate exhibiting a 1/4 wavelength-phase difference in a wide wavelength range by controlling the entire phase difference to a 1/4 wavelength and controlling wavelength dispersion.

In the above-described case, the number of the retardation films laminated is arbitrary. The number of the retardation films laminated is generally in a range of 2 to 5 in terms of the transmittance of light or the like. In addition, the disposition locations of the retardation film in which a 1/2 wavelength-phase difference is provided and the retardation film in which a 1/4 wavelength-phase difference is provided are also arbitrary.

In addition, the 1/4 wavelength plate made of a superimposed body of retardation films can also be obtained by laminating, when retardation of light having a wavelength of 450 nm is represented by $R_{450}$ and retardation in light having a wavelength of 550 nm is represented by $R_{550}$, a retardation film having an $R_{450}/R_{550}$ in a range of 1.00 to 1.05 and a great retardation and a retardation film having the above-described ratio in a range of 1.05 to 1.20 and a small retardation so that optical axes thereof cross each other.

In the above-described case as well, when retardation films having different retardations are laminated so that optical axes thereof cross each other, particularly, are orthogonal to each other, it is possible to control the wavelength dispersion of the retardation in the respective retardation films by means of superimposition, addition, or subtraction, and particularly, it is possible to decrease the retardation toward a smaller wavelength side.

That is, specific examples of the 1/4 wavelength plate in the above-described case include a laminated article of a retardation film (retardation of light having a wavelength of 550 nm: 700 nm) obtained by stretching a polyvinyl alcohol film and a retardation film (retardation of light having a wavelength of 550 nm: 560 nm) obtained by stretching a polycarbonate film laminated together so that optical axes thereof are orthogonal to each other. The above-described laminated article functions almost as the 1/4 wavelength plate in a wavelength range of 450 nm to 650 nm.

The retardation film can be obtained using a method in which, for example, a polymer film is uniaxially or biaxially stretched as described above. The kind of the polymer is not particularly limited, and a polymer having excellent transparency is preferably used. Examples thereof include polycarbonate-based polymers, polyester-based polymers, polysulfone-based polymers, polyether sulfone-based polymers, polystyrene-based polymers, polyolefin-based polymers, polyvinyl alcohol-based polymers, cellulose acetate-based polymers, polyvinyl chloride-based polymers, polymethyl methacrylate-based polymers, and the like.

Particularly, the retardation film having an $R_{450}/R_{550}$ in a range of 1.00 to 1.05 can be formed using a polymer having an absorption end at a wavelength close to 200 nm such as a polyolefin-based polymer, a polyvinyl alcohol-based polymer, a cellulose acetate-based polymer, a polyvinyl chloride-based polymer, or a polymethyl methacrylate-based polymer.

In addition, the retardation film having an $R_{450}/R_{550}$ in a range of 1.05 to 1.20 can be formed using a polymer having an absorption end at a wavelength longer than 200 nm such as a polycarbonate-based polymer, a polyester-based polymer, a polysulfone-based polymer, a polyether sulfone-based polymer, or a polystyrene-based polymer.

As the λ/4 plate satisfying Expressions (1) to (3), it is also possible to use a plate prepared as a laminate of the following λ/2 plate and the following λ/4 plate.

An optical anisotropic layer used as the λ/2 plate and the λ/4 plate will be described. The phase difference of the present invention may include an optical anisotropic layer, the optical anisotropic layer can be formed using one or more curable compositions including a liquid crystalline compound as a main component, and, among liquid crystalline compounds, a liquid crystalline compound having a polymerizable group is preferred, and a liquid crystalline compound formed of one curable composition is preferred.

A λ/4 plate used as the λ/4 plate satisfying Expressions (1) to (3) may be an optical anisotropic support having an intended λ/4 function for itself or may have an optical anisotropic layer or the like on a support made of a polymer film. That is, in the latter case, other layers are laminated on a support, thereby providing a desired λ/4 function to the λ/4 plate. A material constituting the optical anisotropic layer is not particularly limited and may be a layer which is formed of a composition including a liquid crystal compound and exhibits optical anisotropy developed by the alignment of molecules of the liquid crystal compound or a layer having optical anisotropy developed by stretching a polymer film so as to align polymers in the film or may have both layers. That is, the optical anisotropic layer can be constituted with one or more biaxial films or can be constituted by combining two or more uniaxial films such as a combination of a C-plate and an A-plate. It is needless to say that the optical anisotropic layer can also be constituted by combining one or more biaxial films and one or more uniaxial films.

Here, the "λ/4 plate" refers to an optical anisotropic layer in which the in-plane retardation Re (λ) at a specific wavelength of λ nm satisfies $$Re(\lambda)=\lambda/4.$$

This expression may be satisfied at any wavelength (for example, 550 nm) in the visible light range, but the in-plane retardation Re (550) at a wavelength of 550 nm preferably satisfies 115 nm≤Re(550)≤155 nm, and more preferably in a range of 120 nm to 145 nm. In the above-described range, when the λ/4 plate is combined with a λ/2 plate described below, it is possible to reduce the retardation so that light leakage of reflected light is not observed, which is preferable.

A λ/2 plate used as the λ/4 plate satisfying Expressions (1) to (3) may be an optical anisotropic support having an intended λ/2 function for itself or may have an optical anisotropic layer or the like on a support made of a polymer film. That is, in the latter case, other layers are laminated on a support, thereby providing a desired λ/2 function to the λ/2 plate. A material constituting the optical anisotropic layer is not particularly limited and may be a layer which is formed of a composition including a liquid crystal compound and exhibits optical anisotropy developed by the alignment of molecules of the liquid crystal compound or a layer having optical anisotropy developed by stretching a polymer film so as to align polymers in the film or may have both layers. That is, the optical anisotropic layer can be constituted with one or more biaxial films or can be constituted by combining two or more uniaxial films such as a combination of a C-plate and an A-plate. It is needless to say that the optical anisotropic layer can also be constituted by combining one or more biaxial films and one or more uniaxial films.

Here, the "λ/2 plate" used as the λ/4 plate satisfying Expressions (1) to (3) refers to an optical anisotropic layer in which the in-plane retardation Re (λ) at a specific wavelength of λ nm satisfies $$Re(\lambda)=\lambda/2.$$

This expression may be satisfied at any wavelength (for example, 550 nm) in the visible light range. Furthermore, in the present invention, the in-plane retardation Re1 of the λ/2 plate is set to be substantially twice the in-plane retardation Re2 of the λ/4 plate.

Here, "the retardation being substantially twice" means

Re1=2×Re2±50 nm.

However,

Re1=2×Re2±20 nm is more preferred, and

Re1=2×Re2±10 nm is still more preferred. These expressions may be satisfied at any wavelength in the visible light range, but are preferably satisfied at a wavelength of 550 nm. In the above-described range, when the λ/2 plate is combined with the λ/4 plate described above, it is possible to reduce the retardation so that light leakage of reflected light is not observed, which is preferable.

The retardations films are laminated so that the direction of linearly-polarized light transmitted through the λ/4 plate becomes parallel to the transmission axis direction of the backlight-side polarizing plate.

In a case in which the λ/4 plate is a single layer, the angle formed between the slow axis direction of the λ/4 plate and the absorption axis direction of the polarizing plate reaches 45°.

In a case in which the λ/4 plate is a laminate of a λ/4 plate and a λ/2 plate, the angles formed between the slow axis directions of the respective plates and the absorption axis direction of the polarizing plate have the following locational relationship.

In a case in which the Rth of the λ/2 plate at a wavelength of 550 nm is negative, the angle formed between the slow axis direction of the λ/2 plate and the absorption axis direction of a polarizer layer is preferably in a range of 75°±8°, more preferably in a range of 75°±6°, and still more preferably in a range of 75°±3°. Furthermore, at this time, the angle formed between the slow axis direction of the λ/4 plate and the absorption axis direction of the polarizer layer is preferably in a range of 15°±8°, more preferably in a range of 15°±6°, and still more preferably in a range of 15°±3°. In the above-described range, it is possible to reduce the retardation so that light leakage of reflected light is not observed, which is preferable.

In addition, in a case in which the Rth of the λ/2 plate at a wavelength of 550 nm is positive, the angle formed between the slow axis direction of the λ/2 plate and the absorption axis direction of a polarizer layer is preferably in a range of 15°±8°, more preferably in a range of 15°±6°, and still more preferably in a range of 15°±3°. Furthermore, at this time, the angle formed between the slow axis direction of the λ/4 plate and the absorption axis direction of the polarizer layer is preferably in a range of 75°±8°, more preferably in a range of 75°±6°, and still more preferably in a range of 75°±3°. In the above-described range, it is possible to reduce the retardation so that light leakage of reflected light is not observed, which is preferable.

A material for the optical anisotropic support used in the present invention is not particularly limited. A variety of polymer films, for example, polyester-based polymers such as cellulose acylate, a polycarbonate-based polymer, polyethylene terephthalate, and polyethylene naphthalate, acrylic polymers such as polymethyl methacrylate, styrene-based polymers such as polystyrene and an acrylonitrile-styrene copolymer (AS resin), and the like can be used. In addition, one or more polymers are selected from polyolefins such as polyethylene and polypropylene, polyolefin-based polymers such as an ethylene-propylene copolymer, amide-based polymers such as vinyl chloride-based polymers, nylon, and an aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, and polymers obtained by mixing these polymers, polymer films are produced using the selected polymers as main components, and the polymer films can be used for the production of an optical film in a combined form with which the above-described characteristics are satisfied.

In a case in which the λ/2 plate and the λ/4 plate are laminates of the polymer film (transparent support) and the optical anisotropic layer, the optical anisotropic layer preferably includes at least one layer formed of a composition including the liquid crystal compound. That is, the λ/2 plate and the λ/4 plate are preferably laminates of the polymer film (transparent support) and the optical anisotropic layer formed of a composition including the liquid crystal compound. As the transparent support, a polymer film having weak optical anisotropy may be used or a polymer film in which optical anisotropy is developed through a stretching treatment or the like may be used. The light transmittance of the support is preferably 80% or higher.

The kind of the liquid crystal compound used for the formation of the optical anisotropic layer that may be included in the λ/2 plate and the λ/4 plate is not particularly limited. For example, it is also possible to use an optical anisotropic layer obtained by forming a low-molecular-weight liquid crystal compound to be nematic-aligned in a liquid crystal state and then fixing the low-molecular-weight liquid crystal compound through photocrosslinking or thermal crosslinking or an optical anisotropic layer obtained by forming a high-molecular-weight liquid crystal compound to be nematic-aligned in a liquid crystal state and then fixing the alignment by cooling the high-molecular-weight liquid crystal compound. Meanwhile, in the present invention, even in a case in which a liquid crystal compound is used for the optical anisotropic layer, the optical anisotropic layer is a layer formed of the liquid crystal compound being fixed through polymerization or the like, and, once the layer is formed, the optical anisotropic layer does not need to exhibit liquid crystallinity any longer. A polymerizable liquid crystal compound may be a polyfunctional polymerizable liquid crystal compound or a monofunctional polymerizable liquid crystal compound. In addition, the liquid crystal compound may be a discotic liquid crystal compound or a rod-like liquid crystal compound.

Generally, liquid crystal compounds are classified into rod shape-type liquid crystal compounds and disc-type liquid crystal compounds on the basis of the shape of the liquid crystal compound. Furthermore, there are low-molecular-weight liquid crystal compounds and high-molecular-weight liquid crystal compounds, respectively. A high-molecular-weight compound generally refers to a compound having a degree of polymerization of 100 or higher (Polymer Physics and Phase Transition Dynamics, Masao Doi, p. 2, Iwanami Shoten, Publishers, 1992). In the present invention, any liquid crystal compound can be used, but a rod-like liquid crystal compound or a disc-shaped liquid crystal compound is preferably used. Two or more kinds of rod-like liquid crystal compounds, two or more kinds of disc-shaped liquid crystal compounds, or a mixture of a rod-like liquid crystal compound and a disc-shaped liquid crystal compound may be used. Since a change in temperature or a change in humidity can be decreased, the liquid crystal compound is more preferably formed using a rod-like liquid crystal compound or disc-shaped liquid crystal compound having a reactive group, and at least one of the rod-like liquid crystal compound and the disc-shaped liquid crystal compound still more preferably has two or more reactive groups in one liquid crystal molecule. The liquid crystal compound may be a mixture of two or more liquid crystal compounds, and in that case, at least one of the liquid crystal compounds preferably has two or more reactive groups.

As the rod-like liquid crystal compound, for example, the rod-like liquid crystal compound described in JP1999-513019A (JP-H11-513019A) or JP2007-279688A can be preferably used. As the discotic liquid crystal compound, for example, the discotic liquid crystal compound described in JP2007-108732A or JP2010-244038A can be preferably used, but the liquid crystal compound is not limited thereto.

In the optical anisotropic layer, the molecules of the liquid crystal compound are preferably fixed in any alignment state of a homeotropic alignment, a horizontal alignment, a hybrid alignment, and a tilt alignment. In order to produce a phase difference plate in which the view angle reliance is symmetric, the disc surface of the discotic liquid crystal compound is preferably substantially vertical with respect to the film surface (the surface of the optical anisotropic layer) or the long axis of the rod-like liquid crystal compound is preferably substantially horizontal with respect to the film surface (the surface of the optical anisotropic layer). The discotic liquid crystal compound being substantially vertical means that the average value of angles formed between the film surface (the surface of the optical anisotropic layer) and the disc surface of the discotic liquid crystal compound is in a range of 70° to 90°. The average value is more preferably in a range of 80° to 90° and still more preferably in a range of 85° to 90°. The rod-like liquid crystal compound being substantially horizontal means that the angle formed between the film surface (the surface of the optical anisotropic layer) and the director of the rod-like liquid crystal compound is in a range of 0° to 20°. The angle is more preferably in a range of 0° to 10° and still more preferably in a range of 0° to 5°.

In a case in which the λ/2 plate and the λ/4 plate include the optical anisotropic layer including the liquid crystal compound, the optical anisotropic layer may be made of only a single layer or may be a laminate of two or more optical anisotropic layers.

The optical anisotropic layer can be formed by applying a coating fluid including the liquid crystal compound such as the rod-like liquid crystal compound or the discotic liquid crystal compound and, as desired, a polymerization initiator, an alignment controller, and other additives, which will be described below, onto the support. The optical anisotropic layer is preferably formed by forming an alignment film on the support and applying the coating fluid to the surface of the alignment film.

It is preferable to align the molecules of the liquid crystal compound by applying a composition to the surface of the alignment film. Since the alignment film has a function of regulating the alignment direction of the liquid crystal compound, the alignment film is preferably used for realizing a preferred aspect of the present invention. However, when the liquid crystal compound is aligned, and the alignment state is fixed, the alignment film has already played its role and thus is not an essential constitutional element of the present invention any longer. That is, it is also possible to produce the polarizing plate of the present invention by transferring only the optical anisotropic layer on the alignment film having a fixed alignment state onto the support.

The alignment film is preferably formed through a rubbing treatment of a polymer.

Examples of the polymer include methacrylate-based copolymers, styrene-based copolymers, polyolefins, polyvinyl alcohols, denatured polyvinyl alcohols, poly(N-methylolacrylamide), polyesters, polyimides, vinyl acetate copolymers, carboxymethyl cellulose, polycarbonate, and the like which are described in Paragraph "0022" in the specification of JP1996-338913A (JP-H8-338913A). A silane coupling agent can be used as the polymer. A water-soluble polymer (for example, poly(N-methylolacrylamide), carboxymethyl cellulose, gelatin, a polyvinyl alcohol, or a denatured polyvinyl alcohol) is preferred, gelatin, a polyvinyl alcohol, or a denatured polyvinyl alcohol is more preferred, and a polyvinyl alcohol or a denatured polyvinyl alcohol is most preferred.

As the rubbing treatment, a treatment method which is widely employed as a liquid crystal alignment treatment step of LCD can be applied. That is, it is possible to use a method in which alignment is obtained by rubbing the surface of the alignment film in a certain direction using paper, gauze, felt, rubber, nylon, a polyester fiber, or the like. Generally, the rubbing treatment is carried out by rubbing the surface of the alignment film using a cloth on which fibers having uniform length and size are implanted in an average manner approximately several times.

The molecules of the liquid crystal compound are aligned by applying the composition to the rubbed surface of the alignment film. After that, as necessary, an alignment film polymer and a polyfunctional monomer in the optical anisotropic layer are reacted with each other or the alignment film polymer is crosslinked using a crosslinking agent, whereby the optical anisotropic layer can be formed.

The film thickness of the alignment film is preferably in a range of 0.1 μm to 10 μm.

The in-plane retardation (Re) in a transparent support (polymer film) supporting the optical anisotropic layer is preferably in a range of 0 nm to 50 nm, more preferably in a range of 0 nm to 30 nm, and still more preferably in a range of 0 nm to 10 nm. When the in-plane retardation is within the above-described range, light leak of reflected light can be reduced so as to be invisible, which is preferable.

In addition, the retardation in the thickness direction (Rth) in the support is preferably selected by combining the support with the optical anisotropic layer provided on or below the support. In such a case, light leak of reflected light when observed in a tilt direction and tinting can be reduced.

Examples of the polymer include polyolefins such as a cellulose acylate film (for example, a cellulose triacetate film (refractive index: 1.48), a cellulose diacetate film, a cellulose acetate butyrate film, or a cellulose acetate propionate film), polyethylene, and polypropylene, polyester-based resin films such as polyethylene terephthalate and polyethylene naphthalate, polyacrylic resin films such as a polyether sulfone film and a polymethyl methacrylate, polyurethane-based resin films, polyester films, polycarbonate films, polysulfone films, polyether films, polymethyl pentene films, polyether ketone films, (meth)acrylonitrile films, polyolefins, polymers having an alicyclic structure (a norbornene-based resin (ARTON: trade name, manufactured by JSR Corporation) or amorphous polyolefin (ZEONEX: trade name, manufactured by ZEON Corporation)), and the like. Among these, triacetyl cellulose, polyethylene terephthalate, and the polymers having an alicyclic structure are preferred, and triacetyl cellulose is particularly preferred.

The thickness of the transparent support can be in a range of approximately 10 μm to 200 μm, but is preferably in a range of approximately 10 μm to 80 μm, and more preferably in a range of approximately 20 μm to 60 μm. In addition, the transparent support may be formed by laminating a plurality of layers. While a thin thickness is preferred for suppression of external light reflection, a thickness of smaller than 10 μm weakens the strength of the film, which is not preferable. In order to improve adhesiveness between the transparent support and layers provided on the transparent support (an adhesive layer, a homeotropic alignment film, or a phase difference layer), a surface treatment (for example, a glow discharge treatment, a corona discharge treatment, an ultraviolet (UV) treatment, or a flame treatment) may be carried out on the transparent support. An adhesive layer (undercoat layer) may be provided on the transparent support. In addition, as the transparent support or a long transparent support, a support formed by applying a polymer layer into which inorganic particles having an average particle diameter in a range of approximately 10 nm to 100 nm are mixed in a solid content weight ratio of 5% to 40% to one side of the support or by co-casting the polymer layer and the support is preferably used in order to impart slidability in a transportation step or prevent the rear surface and the front surface from being attached to each other after winding.

Meanwhile, in the above description, the λ/2 plate or the λ/4 plate having the laminate structure in which the optical anisotropic layer is provided on the support has been described, but the present invention is not limited to this aspect, and the λ/2 plate and the λ/4 plate may be laminated on one surface of one transparent support or the λ/2 plate and the λ/4 plate may be respectively laminated on both surfaces of one transparent support. Furthermore, the λ/2 plate or the λ/4 plate may be formed of a stretched polymer film (optical anisotropic support) alone or a liquid crystal film formed of a composition including the liquid crystal compound alone. The preferred example of the liquid crystal film is also identical to the preferred example of the optical anisotropic layer.

The λ/2 plate and the λ/4 plate are preferably continuously manufactured in a state of a long film. At this time, the slow axis angle of the λ/2 plate or the λ/4 plate is preferably 15°±8° or 75° with respect to the longitudinal direction of the long film. In such a case, in the manufacturing of an optical laminate described below, it becomes possible to match the longitudinal direction of the long film and the longitudinal direction of a polarizing film and attach the long film and the polarizer together using a roll-to-roll method, and it becomes possible to manufacture a circular polarizing plate or an ellipsoidal polarizing plate having high accuracy in terms of the axis angle of attachment and high productivity. Meanwhile, in a case in which the optical anisotropic layer is formed of the liquid crystal compound, the angle of the slow axis of the optical anisotropic layer can be adjusted to be a desired value by means of the angle of rubbing. In addition, in a case in which the λ/2 plate or the λ/4 plate is formed of a stretched polymer film (optical anisotropic support), the angle of the slow axis can be adjusted to be a desired value depending on the stretching direction.

(Method for attaching polarization separating member)

In the liquid crystal display device of the present invention, the polarization separating member and the liquid crystal cell or the backlight-side polarizer are preferably disposed adjacent to each other directly, through an adhesive layer, or through a polarizing plate protective film.

In addition, in the polarization separation member, the reflection polarizer and the λ/4 plate are preferably sequentially laminated from the backlight side in direct contact with each other or through an adhesive layer.

When the members are integrated together, it is possible to prevent poor display caused by the thickness reduction of the members, a decrease in the interface reflection loss at an air layer in a gap between the members, and the entering of a foreign substance between the members which is likely to occur during or after the manufacturing of the liquid crystal display device.

As the method for attaching the members together, a well-known method can be used. The polarization separating member is preferably formed by transferring the light reflection layer formed by fixing a cholesteric liquid crystalline phase, which is provided on a temporary support, onto the liquid crystal cell or the backlight-side polarizer so as to be laminated and peeling the temporary support off as necessary. In addition, a roll-to-panel method can also be used and is preferred since productivity and yield are improved. The roll-to-panel method is described in JP2011-48381A, JP2009-175653A, JP4628488B, JP4729647B, WO2012/014602A, WO2012/014571, and the like, but the roll-to-panel method is not limited thereto.

Examples of a method for laminating the members in direct contact with each other include a method in which each member is laminated by being applied to another member.

In addition, an adhesive layer (adhesive layer) may be disposed between the members.

The adhesive layer refers to, for example, a substance in which the ratio (tan δ=G"/G') of the storage modulus of elasticity G' to the loss modulus of elasticity G" which are measured using a dynamic viscoelasticity measurement instrument is in a range of 0.001 to 1.5, and examples thereof include adhesives, substances that easily creep, and the like. Examples of the adhesive that can be used in the present invention include acrylic pressure sensitive adhesives and polyvinyl alcohol-based adhesives, but the adhesive is not limited thereto.

Examples of an adhesive that can be used in the adhesive layer include resins such as polyester-based resins, epoxy-based resins, polyurethane-based resins, silicone-based resins, and acrylic resins. These adhesives may be used singly or in a mixed form of two or more adhesives. Particularly, acrylic resins are preferred since the acrylic resins have excellent reliability in terms of water resistance, heat resistance, and light resistance and have a favorable adhesive force and favorable transparency, and furthermore, the refractive index is easily adjusted to be suitable for liquid crystal display. Examples of the acrylic pressure sensitive adhesives include acrylic acid and esters thereof, methacrylic acid and esters thereof, homopolymers of acryl monomers such as acrylamide or acrylonitrile or copolymers thereof, and furthermore, copolymers of at least one acryl monomer and an aromatic vinyl monomer such as vinyl acetate, maleic anhydride, or styrene. Particularly, an adhesive which is a copolymer made up of a main monomer such as ethylene acrylate, butyl acrylate, or 2-ethylhexyl acrylate, which develops adhesiveness, a monomer such as vinyl acetate, acrylonitrile, acrylamide, styrene, methacrylate, or methyl acrylate, which serves as an aggregation force component, and furthermore, a functional group-containing monomer such as methacrylic acid, acrylic acid, itaconic acid, hydroxyethyl methacrylate, hydroxypropyl methacrylate, dimethylamino ethyl methacrylate, acrylamide, methylolacryl amide, glycidyl methacrylate, or maleic anhydride, which improves the adhesive force or imparts a crosslinking origination, has a glass transition temperature (Tg) in a range of −60° C. to −15° C., and has a weight-average molecular weight in a range of 200,000 to 1,000,000 is preferred.

As a curing agent, for example, a metal chelate-based cross-linking agent, an isocyanate-based cross-linking agent, an epoxy-based cross-linking agent, or a mixture of two or more thereof can be used as necessary. The acrylic pressure sensitive adhesive is practically preferably formulated into in a state of including a filler described below so that the adhesive force falls into a range of 100 g/25 mm to 2000 g/25 mm. When the adhesive force is smaller than 100 g/25 mm, environment resistance is poor, particularly, there is a concern that peeling may occur at a high temperature and a high humidity. Conversely, when the adhesive force is greater than 2000 g/25 mm, there is a problem in that attachment correction is not possible or, even if possible, the adhesive remains. The refractive index (the B method according to JIS K-7142) of the acrylic pressure sensitive adhesive is in a range of 1.45 to 1.70 and particularly preferably in a range of 1.5 to 1.65.

The adhesive includes a filler in order to adjust the refractive index to be a desired value. Examples of the filler include inorganic white pigments such as silica, calcium carbonate, aluminum hydroxide, magnesium hydroxide, clay, talc, and titanium dioxide, organic transparent or white pigments such as an acrylic resin, a polystyrene resin, a polyethylene resin, an epoxy resin, and a silicone resin, and the like. An acrylic pressure sensitive adhesive is preferably selected since silicon beads or epoxy resin beads have excellent dispersibility with respect to the acrylic pressure sensitive adhesive, and a uniform and favorable refractive index can be obtained. In addition, the filler is preferably a spherical filler in which light uniformly diffuses.

The particle diameter (JIS B9921) of the filler is desirably in a range of 0.1 μm to 20.0 μm and preferably in a range of 0.5 μm to 10.0 μm. Particularly, the particle diameter is preferably in a range of 1.0 μm to 10 μm.

The refractive index (the B method according to JIS K-7142) of the filler preferably has a difference from the refractive index of the adhesive in a range of 0.05 to 0.5 and more preferably in a range of 0.05 to 0.3.

The content of the filler in a diffusion adhesive layer is in a range of 1.0% by mass to 40.0% by mass and particularly desirably in a range of 3.0% by mass to 20% by mass.

<Backlight-side polarizing plate and display-side polarizing plate>

Next, the backlight-side polarizing plate and the display-side polarizing plate will be described.

The polarizing plate in the liquid crystal display device of the present invention preferably includes a polarizer and a polarizing plate protective film disposed on any one surface of the polarizer and more preferably includes a polarizer and two polarizing plate protective films (hereinafter, also referred to as the protective film) disposed on both sides of the polarizer. The polarization separation member may be used as the polarizing plate protective film on the outer side of the backlight-side polarizing plate, and the polarizing plate protective film on the inner side of the backlight-side polarizing plate may not be used. In a case in which the polarization separation member is not used as the polarizing plate protective film on the outer side of the backlight-side polarizing plate and is used as a member independent of the polarizing plate protective film, in the present invention, a thinner protective film (60 μm or smaller, preferably 40 μm or smaller, and more preferably 25 μm or smaller) is preferably used in order to decrease the thickness thereof. A hard coat obtained by applying, drying, and curing a protective resin such as an acrylic resin (having a thickness of 20 µm or smaller, preferably 10 µm or smaller, and more preferably 5 µm or smaller) is more preferably used.

A polarizer not provided with a protective layer is more preferably used for realizing the additional reduction of thickness.

In the present invention, as the polarizing plate protective film on the inner side disposed on the liquid crystal cell side out of the two polarizing plate protective films, in the case of the liquid crystal display device in a VA, IPS, TN, or OCB mode, a retardation film is more preferably used; however, in the case of the liquid crystal display device in an IPS mode, an optical compensation film barely having a phase difference is preferably used, and the polarizing plate protective film on the inner side is preferably not used for realizing the additional reduction of thickness.

(Polarizer)

As the polarizer, a polarizer obtained by adsorbing and aligning iodine in a polymer film is preferably used. The polymer film is not particularly limited, and a variety of polymer films can be used. Examples thereof include hydrophilic polymer films such as a polyvinyl alcohol-based film, a polyethylene terephthalate-based film, an ethylene-vinyl acetate copolymer-based film, films obtained by partially saponifying the above-described film, a hydrophilic polymer film such as a cellulose-based film, a polyene-based alignment film such as a dehydrated substance of a polyvinyl alcohol or a dechlorinated substance of a polyvinyl chloride. Among these, a polyvinyl alcohol-based film having an excellent dyeing affinity due to iodine as a polarizer is preferably used.

As a material for the polyvinyl alcohol-based film, a polyvinyl alcohol or a derivative thereof is used. Examples of the derivative of a polyvinyl alcohol include polyvinyl formal, polyvinyl acetal, and furthermore, polyvinyl formal and polyvinyl acetal which are denatured using an olefin such as ethylene or propylene, a unsaturated carboxylic acid such as acrylic acid, methacrylic acid, or crotonic acid, an alkyl ester or acrylamide thereof, or the like.

The degree of polymerization of the polymer which is a material for the polymer film is generally in a range of 500 to 10,000, preferably in a range of 1000 to 6000, and more preferably in a range of 1400 to 4000. Furthermore, in the case of a saponified film, the degree of saponification is, for example, preferably 75% by mol or higher, more preferably 98% by mol or higher, and even more preferably in a range of 98.3% by mol to 99.8% by mol in terms of solubility in water.

The polymer film (un-stretched film) is subjected to at least a uniaxial stretching treatment and a iodine dyeing treatment according to an ordinary method. Furthermore, it is possible to carry out a boric acid treatment and a cleansing treatment on the polymer film. In addition, the polymer film that has been subjected to the above-described treatments (stretched film) is dried according to an ordinary method, thereby turning into a polarizer.

A stretching method in the uniaxial stretching treatment is not particularly limited, and any of a wet stretching method and a dry stretching method can be employed. Examples of stretching means for the dry stretching method include an inter-roll stretching method, a heating roll stretching method, a compression stretching method, and the like. The polymer film can be stretched in multiple stages. In the stretching means, the un-stretched film is generally turned into a heated state. The stretching ratio of the stretched film can be appropriately set according to the purpose, and the stretching ratio (total stretching ratio) is desirably set in a range of approximately 2 times to 8 times, preferably set in a range of 3 times to 7 times, and more preferably set in a range of 3.5 times to 6.5 times.

The iodine dyeing treatment is carried out by, for example, immersing the polymer film in an iodine solution including iodine and potassium iodide. The iodine solution is generally an aqueous solution of iodine and includes iodine and potassium iodide as a solution aid.

The concentration of iodine is in a range of approximately 0.01% by mass to 1% by mass and preferably in a range of 0.02% by mass to 0.5% by mass. The concentration of potassium iodide is in a range of approximately 0.01% by mass to 10% by mass and, furthermore, preferably in a range of 0.02% by mass to 8% by mass.

In the iodine dyeing treatment, the temperature of the iodine solution is generally in a range of approximately 20° C. to 50° C. and preferably generally in a range of 25° C. to 40° C. The immersion duration is generally in a range of approximately 10 seconds to 300 seconds and preferably in a range of 20 seconds to 240 seconds. In the iodine dyeing treatment, the content of iodine and the content of potassium in the polymer film are adjusted to fall into the above-described ranges by adjusting the conditions such as the concentration of the iodine solution and the immersion temperature and immersion duration of the polymer film in the iodine solution to be desired values. The iodine dyeing treatment may be carried out in any stage of before the uniaxial stretching treatment, during the uniaxial stretching treatment, and after the uniaxial stretching treatment.

When optical characteristics are taken into account, the content of iodine in the polarizer is, for example, in a range of 2% by mass to 5% by mass and preferably in a range of 2% by mass to 4% by mass.

The polarizer preferably includes potassium. The content of potassium is preferably in a range of 0.2% by mass to 0.9% by mass and more preferably in a range of 0.5% by mass to 0.8% by mass. When the polarizer includes potassium, the polarizer has a preferred complex modulus of elasticity (Er), and a polarization film having a high degree of polarization can be obtained. Potassium can be added to the polarizer by, for example, immersing the polymer film, which is a material for forming the polarizer, in a solution including potassium. This solution may also serve as the solution including iodine.

As the drying treatment step, a well-known drying method in the related art such as natural drying, blowing drying, or heating drying can be used. For example, in heating drying, the heating temperature is in a range of approximately 20° C. to 80° C., and the drying duration is in a range of approximately 1 minute to 10 minutes. In addition, the polymer film can be appropriate stretched in the drying treatment step as well.

The thickness of the polarizer is not particularly limited, but is generally in a range of 1 µm to 100 µm, preferably in a range of 3 µm to 30 µm, and more preferably in a range of 5 µm to 20 µm.

Regarding the optical characteristics of the polarizer, when measured using a polarizer single body, the single body transmittance is preferably 43% or higher and more preferably in a range of 43.3% to 45.0%. In addition, the orthogonal transmittance, which is measured by preparing two polarizers and superimposing the polarizers so that the absorption axes of the two polarizers form 90°, is preferably smaller, practically, preferably in a range of 0.00% to 0.050%, and more preferably 0.030% or smaller. The degree of polarization is, practically, preferably in a range of 99.90% to 100% and particularly preferably in a range of 99.93% to 100%. The polarizer is preferably capable of producing almost the same optical characteristics as what have been described above even when the optical characteristics are measured as the polarizing plate as well.

(Polarizing plate protective film)

Among protective films, as the protective film disposed on a side opposite to the liquid crystal cell, a thermoplastic resin having excellent transparency, mechanical strength, thermal stability, moisture-shielding properties, isotropy, and the like is used. Specific examples of the thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (norbornene-based resin), a polyarylate resin, a polystyrene resin, a polyvinyl alcohol resin, and mixtures thereof.

Particularly, in the liquid crystal display device of the present invention, in a case in which the backlight-side polarizing plate includes a polarizer and two polarization protective films disposed on both surfaces of the polarizer, and the polarization separating member is not used as the polarizing plate protective film on the outer side of the backlight-side polarizing plate, at least the polarizing plate protective film on the polarization separating member side (the side opposite to the liquid crystal cell) out of the two polarizing plate protective films is preferably a cellulose acylate film.

The cellulose resin is an ester of cellulose and an aliphatic acid. Specific examples of the cellulose ester-based resin include triacetyl cellulose, diacetyl cellulose, tripropyl cellulose, dipropyl cellulose, and the like. Among these, triacetyl cellulose is particularly preferred. A number of products of triacetyl cellulose are commercially available, and thus triacetyl cellulose is advantageous in terms of ease of procurement and costs as well. Examples of the commercially available product of triacetyl cellulose include "UV-50", "UV-80", "SH-80", "TD-80U", "TD-TAC", and "UZ-TAC" trade names manufactured by Fujifilm Corporation, "KC series" manufactured by Konica Corporation, and the like.

The cyclic polyolefin resin is, as a specific example, preferably a norbornene-based resin. A cyclic olefin-based resin is a collective term for resins polymerized using a cyclic olefin as a polymerization unit, and examples thereof include the resins described in JP1989-240517A (JP-H1-240517A), JP1991-14882A (JP-H3-14882A), JP1991-122137A (JP-H3-122137A), and the like. Specific examples thereof include open-ring (co)polymers of cyclic olefins, addition polymers of cyclic olefins, copolymers of a cyclic olefin and an α-olefin such as ethylene or propylene (typically, a random copolymer), graft polymers obtained by denaturing the above-described resin using unsaturated carboxylic acid or a derivative thereof, hydrogenated substances thereof, and the like. Specific examples of the cyclic olefin include norbornene-based monomers.

As the cyclic polyolefin resin, a variety of products are commercially available. Specific examples thereof include "ZEONEX", "ZEONOA" trade names manufactured by ZEON Corporation, "ARTON" trade name manufactured by JSR Corporation, "TOPAS" trade name manufactured by TICONA Corporation, and "APEL" trade name manufactured by Mitsui Chemicals, Inc.

As the (meth)acrylic resin, an arbitrary appropriate (meth) acrylic resin can be employed as long as the effects of the present invention are not impaired. Examples thereof include poly(meth)acrylic acid esters such as methyl polymethacrylate, methyl methacrylate-(meth)acrylic acid copolymers, methyl methacrylate-(meth)acrylic acid ester copolymers, methyl methacrylate-acrylic acid ester-(meth) acrylic acid copolymer, methyl (meth)acrylate-styrene copolymers (MS resins and the like), and polymers having an alicyclic hydrocarbon group (for example, methyl methacrylate-cyclohexyl methacrylate copolymer, methyl methacrylate-(meth)acrylic acid norbornyl copolymer, and the like). Preferred examples thereof include C1-6 alkyl poly(meth) acrylate such as polymethyl (meth)acrylate, and more preferred examples thereof include methyl methacrylate-based resins including methyl methacrylate as a main component (50% by mass to 100% by mass and preferably 70% by mass to 100% by mass).

Specific examples of the (meth)acrylic resin include ACRYPET VH and ACRYPET VRL20A manufactured by Mitsubishi Rayon Co., Ltd., the (meth)acrylic resin having a ring structure in the molecule described in JP2004-70296A, and the (meth)acrylic resin having a high Tg which is obtained through intramolecular cross-linking or an intramolecular cyclization reaction.

As the (meth)acrylic resin, it is also possible to use a (meth)acrylic resin having a lactone ring structure. This is because the (meth)acrylic resin has high heat resistance, high transparency, and high mechanical strength when being biaxial-stretched.

The thickness of the protective film can be appropriately set and is generally in a range of approximately 1 μm to 500 μm in terms of strength, operability such as handling, and thin layer properties. Particularly, the thickness thereof is preferably in a range of 1 μm to 300 μm and more preferably in a range of 5 μm to 200 μm. The thickness of the protective film is particularly suitably in a range of 5 μm to 150 μm.

Re (λ) and Rth (λ) respectively represent the in-plane retardation and the retardation in the thickness direction at a wavelength λ. Re (λ) is measured by introducing light having a wavelength of λ nm in the film normal direction in a KOBRA 21ADH or WR (manufactured by Oji Scientific Instruments Co., Ltd.). When selecting the measurement wavelength of λ nm, it is possible to measure the retardations by manually exchanging wavelength selective filters or converting a measurement value using a program or the like. In a case in which a film to be measured is expressed as a uniaxial or biaxial index ellipsoid, Rth (λ) is computed using the following method. Meanwhile, a part of this measurement method is also used for the measurement of the average tilt angle on the alignment film side of a discotic liquid crystal compound molecule in an optical anisotropic layer described below and an average tilt angle on the side opposite thereto.

Rth (λ) is computed as described below. Re (λ) is measured at a total of six points by introducing light having a wavelength of λ nm in directions tilted at 10 degree intervals from the normal direction to the film, which is determined using the in-plane slow axis (determined using KOBRA 21ADH or WR) as a tilt axis (rotational axis) (in a case in which there is no slow axis, an arbitrary direction in the film is used as the rotational axis), through 50° toward a single side, and Rth (λ) is computed on the basis of the measured retardation values, an assumed average refractive index, and the input film thickness value using KOBRA 21ADH or WR. In the above description, in the case of a film having a direction in which the retardation value reaches zero at a certain tilt angle from the normal direction determined using the in-plane slow axis as the rotational axis, the retardation value at a tilt angle larger than the above-described tilt angle is changed into a negative value and then is computed using KOBRA 21ADH or WR. Meanwhile, Rth ($\lambda$) can also be computed as described below. Retardation values are measured in two arbitrary tilt directions using the slow axis as a tilt axis (rotational axis) (in a case in which there is no slow axis, an arbitrary direction in the film is used as the rotational axis), and Rth is computed on the basis of the above-described values, an assumed average refractive index, and the input film thickness value using Expressions (A) and (B) below.

$$Re(\theta) = \left[ nx - \frac{(ny \times nz)}{\left( \sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2} \right)} \right] \times \frac{d}{\cos\left\{\sin^{-1}\left(\frac{\sin(-\theta)}{nx}\right)\right\}}$$ Expression (A)

Meanwhile, the Re ($\theta$) represents a retardation value in a direction tilted at an angle $\theta$ from the normal direction. In addition, in Expression (A), nx represents the refractive index in the slow axis direction in the plane, ny represents the refractive index in a direction orthogonal to nx in the plane, and nz represents the refractive index in a direction orthogonal to nx and ny. d represents the film thickness.

$$Rth = ((nx+ny)/2 - nz) \times d$$ Expression (B)

In a case in which a film to be measured cannot be expressed as a uniaxial or biaxial index ellipsoid, that is, does not have any optic axis, Rth ($\lambda$) is computed using the following method. Re ($\lambda$) is measured at a total of 11 points by introducing light having a wavelength of $\lambda$ nm in directions tilted at 10 degree intervals from −50° to +50° with respect to the normal direction to the film, which is determined using the in-plane slow axis (determined using KOBRA 21ADH or WR) as a tilt axis (rotational axis), and Rth ($\lambda$) is computed on the basis of the measured retardation values, an assumed average refractive index, and the input film thickness value using KOBRA 21ADH or WR. In the above measurement, as the assumed average refractive index, values from a polymer handbook (JOHN WILEY & SONS, INC) and a variety of optical film catalogues can be used. For optical films having unknown average refractive index values, the refractive index values can be measured using an Abbe refractometer. The average refractive index values of the major optical films will be described below: cellulose acylate (1.48), cycloolefin polymer (1.52), polycarbonate (1.59), polymethylmethacrylate (1.49), and polystyrene (1.59). When these assumed average refractive index values and the film thickness are input, KOBRA 21ADH or WR computes nx, ny, and nz. Nz is further computed using the computed nx, ny, and nz from an equation Nz=(nx−nz)/(nx−ny).

Meanwhile, in the present specification, "visible light" refers to light having a wavelength in a range of 380 nm to 780 nm. In addition, in the present specification, the measurement wavelength is 550 nm unless particularly specified.

In addition, in the present specification, angles (for example, angles such as "90°"') and relationships therebetween (for example, "orthogonal", "parallel", "crossing at 45°"', and the like) do not necessarily need to be exact as long as the margin of error is within an acceptable range in the technical field to which the present invention belongs. For example, a specific angle means an angle in a range of the specific angle±smaller than 10°, and the margin of error from the specific angle is preferably 5° or lower and more preferably 3° or lower.

In the present specification, the "slow axis" in the retardation film or the like refers to a direction in which the refractive index becomes greatest.

In addition, in the present specification, numeric values, numeric ranges, and qualitative expressions (for example, expressions such as "identical" and "equivalent") indicating the optical characteristics of the respective members such as a phase difference region, the retardation film, and the liquid crystal layer are interpreted to include numeric values, numeric ranges, and properties having a margin of error within a range generally acceptable in the liquid crystal display device and the members used therein.

In addition, in the present specification, "front surface" refers to the normal direction to the display surface, "front surface contrast (CR)" refers to the contrast computed from white luminance and black luminance measured in the normal direction to the display surface, and "view angle contrast (CR)" refers to the contrast computed from white luminance and black luminance measured in a tilt direction tilted from the normal direction to the display surface (for example, a direction defined as 60 degrees in the polar angle direction with respect to the display surface).

(Adhesive layer)

For attachment between the polarizer and the protective film, it is possible to appropriately employ an adhesive or the like depending on the polarizer and the protective film. The adhesive and an adhesion treatment method are not particularly limited, and, for example, the polarizer and the protective film can be attached together using an adhesive made of a vinyl polymer, an adhesive made of at least a water-soluble cross-linking agent of a vinyl alcohol-based polymer such as boric acid, borax, glutaraldehyde, melamine, or oxalic acid. The adhesive layer made of the above-described adhesive can be formed in a form of an applied and dried layer of an aqueous solution or the like, and, in preparation of the aqueous solution, it is possible to formulate a cross-linking agent, other additives, and a catalyst such as an acid as necessary. Particularly, in a case in which a polyvinyl alcohol-based polymer film is used as the polarizer, an adhesive including a polyvinyl alcohol-based resin is preferably used in terms of adhesiveness. Furthermore, an adhesive including a polyvinyl alcohol-based resin having an acetoacetyl group is more preferred in terms of improving durability.

The polyvinyl alcohol-based resin is not particularly limited, but a polyvinyl alcohol-based resin having an average degree of polarization in a range of approximately 100 to 3000 and an average degree of saponification in a range of approximately 85% by mol to 100% by mol is preferred in terms of adhesiveness. In addition, the concentration of the adhesive aqueous solution is not particularly limited, but is preferably in a range of 0.1% by mass to 15% by mass and more preferably in a range of 0.5% by mass to 10% by mass. The thickness of the dried adhesive layer is preferably in a range of approximately 30 nm to 1000 nm and more preferably in a range of 50 nm to 300 nm. When the thickness is too thin, the adhesive force becomes insufficient, and, when the thickness is too thick, there is a high possibility that a problem may be caused in terms of appearance.

As additional examples of the adhesive, it is possible to use a thermosetting resin or an ultraviolet-curable resin such as a (meth)acrylic resin, an urethane-based resin, an acrylurethane-based resin, an epoxy-based resin, or a silicone-based resin.

<Liquid crystal cell>

The constitution of the liquid crystal cell is not particularly limited, and it is possible to employ a liquid crystal cell having an ordinary constitution. The liquid crystal cell includes, for example, a pair of substrates disposed opposite to each other and a liquid crystal layer sandwiched between a pair of the substrates and may include a color filter layer or the like as necessary. The driving mode of the liquid crystal cell is also not particularly limited, and it is possible to use a variety of modes such as twisted nematic (TN), super twisted nematic (STN), vertical alignment (VA), in-plane switching (IPS), and optically compensated bend cell (OCB).

The liquid crystal cell used in the liquid crystal display device of the present invention is preferably a VA-mode liquid crystal cell, an OCB-mode liquid crystal cell, an IPS-mode liquid crystal cell, or a TN-mode liquid crystal cell, but is not limited thereto.

In the TN-mode liquid crystal cell, when no voltage is applied thereto, rod-like liquid crystal molecules are substantially horizontally aligned and, furthermore, are aligned in a twisted manner at 60° to 120°. The TN-mode liquid crystal cell is most frequently used as a color TFT liquid crystal display device and is described in a number of publications.

In the VA-mode liquid crystal cell, when no voltage is applied thereto, rod-like liquid crystal molecules are substantially vertically aligned. Examples of the VA-mode liquid crystal cell include not only (1) a narrowly-defined VA-mode liquid crystal cell in which rod-like liquid crystal molecules are substantially vertically aligned when no voltage is applied thereto and substantially horizontally aligned when a voltage is applied thereto (described in JP1990-176625A (JP-H2-176625A)) but also (2) a (MVA-mode) liquid crystal cell obtained by forming multi-domains in the VA-mode liquid crystal cell in order to expand the view angle (described on p. 845 in SID97, Digest of tech. Papers (proceedings) 28 (1997)), (3) a liquid crystal cell having a mode in which rod-like liquid crystal molecules are substantially vertically aligned when no voltage is applied thereto and are twisted and multi-domain-aligned when a voltage is applied thereto (n-ASM mode) (described in Proceedings 58 and 59 (1998) of Japanese Liquid Crystal Conference), and (4) a SURVIVAL-mode liquid crystal cell (disclosed in LCD International 98). In addition, the VA-mode liquid crystal cell may be any one of a patterned vertical alignment (PVA)-type liquid crystal cell, an optical alignment-type liquid crystal cell, and a polymer-sustained alignment (PSA) liquid crystal cell. Details of the above-described modes are described in detail in JP2006-215326A and JP2008-538819A.

In the IPS-mode liquid crystal cell, rod-like liquid crystal molecules are aligned substantially parallel to the substrate, and the liquid crystal molecules respond in a planar manner when a planar electric field is applied to the substrate surface. The IPS-mode liquid crystal cell displays black when no electric field is applied thereto, and the absorption axes of a pair of top and bottom polarizing plates are orthogonal to each other. A method for improving a view angle by reducing leakage of light occurring when the liquid crystal cell displays black in a tilt direction using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), JP1998-307291A (JP-H10-307291A), and the like.

An embodiment of the liquid crystal display device is preferably constituted by including a liquid crystal cell in which a liquid crystal layer is sandwiched between facing substrates at least one of which is provided with an electrode and disposing the liquid crystal cell between two polarizing plates. The liquid crystal display device includes a liquid crystal cell in which liquid crystals are sealed between top and bottom substrates and displays an image by applying a voltage thereto so as to change the alignment state of the liquid crystals. Furthermore, the liquid crystal display device includes functional layers accompanying a polarizing plate protective film, an optical compensation member performing optical compensation, and an adhesive layer as necessary.

<Other members>

In addition, the liquid crystal display device of the present invention may include other members. For example, surface layers such as a forward scattering layer, a primer layer, an antistatic layer, and an undercoat layer may be disposed together with (or in place of) a color filter substrate, a thin film transistor substrate, a lens film, a diffusion sheet, a hard coat layer, an antireflection layer, a temporary reflection layer, an antiglare layer, and the like.

(Color filter)

Regarding pixels in the present invention, in a case in which visible light B having a wavelength of 500 nm or shorter is used as a light source, as a method for forming RGB pixels, a variety of well-known methods can be used. For example, it is possible to form a desired black matrix and R, G, and B pixel patterns on a glass substrate using a photomask and a photoresist or to form a black matrix having a desired width using R, G, and B pixel-coloring inks and eject an ink composition into a region partitioned by black matrixes which has a width larger than that of the above-described black matrix provided every n pixels (a concave section surrounded by convex sections) until a desired concentration thereof is reached, thereby producing a color filter made up of R, G, and B patterns. After the image is colored, individual pixels and the black matrixes may be completely cured through baking or the like.

Preferred characteristics of the color filter are described in JP2008-083611A, the content of which is incorporated into the present invention.

For example, in a color filter exhibiting green, one of the wavelengths at which the transmittance reaches half the maximum transmittance is preferably in a range of 590 nm to 610 nm, and the other is preferably in a range of 470 nm to 500 nm. In addition, in a color filter exhibiting green, one of the wavelengths at which the transmittance reaches half the maximum transmittance is preferably in a range of 590 nm to 600 nm. Furthermore, in a color filter exhibiting green, the maximum transmittance is preferably 80% or higher. In a color filter exhibiting green, the wavelengths at which the transmittance reaches the maximum is preferably in a range of 530 nm to 560 nm.

In the light source included in a light source unit, the wavelength of a light emission peak in a wavelength range of 600 nm to 700 nm is preferably in a range of 620 nm to 650 nm. The light source included in the light source unit has a light emission peak in a wavelength range of 600 nm to 700 nm, and, in a color filter exhibiting green, the transmittance at the wavelength of the light emission peak is preferably 10% or lower of the maximum transmittance.

In a color filter exhibiting red, the transmittance in a range of 580 nm to 590 nm is preferably 10% or lower of the maximum transmittance.

As pigments for the color filter, C. I. Pigment Blue 15:6 and, as a complementary pigment, C. I. Pigment Violet 23 are used for blue. C. I. Pigment Red 254 and, as a complementary pigment, C. I. Pigment Yellow 139 are used for red. As green pigments, generally, C. I. Pigment Green 36 (copper phthalocyanine bromide green), C. I. Pigment Green 7 (copper phthalocyanine chloride green), as complementary pigments, C. I. Pigment Yellow 150, C. I. Pigment Yellow 138, and the like are used. The half value wavelength can be controlled by adjusting the composition of these pigments. The half value wavelength on the long wavelength side can be set in a range of 590 nm to 600 nm by increasing the amount of the composition of the complementary pigments little by little with respect to a comparative example. Meanwhile, currently, pigments are generally used, but dyes may be used for the color filter as long as the dyes are colorants capable of controlling the spectroscope and of ensuring process stability and reliability.

(Black matrix)

In the liquid crystal display device of the present invention, a black matrix is disposed between individual pixels. Examples of a material forming the black stripe include a sputtered film of a metal such as chromium, a light-shielding photosensitive composition obtained by combining a photosensitive resin or a black coloring agent, and the like. Specific examples of the black coloring agent include carbon black, titanium carbon, iron oxide, titanium oxide, graphite, and the like, and, among these, carbon black is preferred.

(Thin film transistor)

The liquid crystal display device of the present invention preferably further includes a TFT substrate including a thin film transistor (hereinafter, also referred to as TFT).

The thin film transistor preferably includes an oxide semiconductor layer having a carrier concentration of lower than $1 \times 10^{14}/cm^3$. A preferred aspect of the thin film transistor is described in JP2011-141522A, the content of which is incorporated into the present invention.

EXAMPLES

Hereinafter, characteristics of the present invention will be more specifically described using examples and comparative examples. Materials, used amounts, proportions, processing contents, processing orders, and the like described in the following examples can be appropriately altered within the purport of the present invention. Therefore, the scope of the present invention should not be limitedly interpreted by specific examples described below.

Example 1

<Preparation of polarizing plate 1>

As a front-side polarizing plate protective film of a backlight-side polarizing plate, a commercially available cellulose acylate-based film "TD60" (manufactured by Fujifilm Corporation) was used.

As a rear polarizer protective film of the backlight-side polarizing plate, a cellulose acylate-based film "TD60" (manufactured by Fujifilm Corporation) was used.

A polarizer was manufactured in the same manner as described in "0219" and "0220" of JP2006-293275A, and the above-described two polarizing plate protective films were attached to both surfaces of the polarizer, thereby manufacturing a polarizing plate 1.

(Formation of broadband λ/4 plate)

A broadband λ/4 plate was prepared in the same manner as in "0020" to "0033" of JP2003-262727A. The broadband λ/4 plate was obtained by applying two layers of a liquid crystalline material on a base material, polymerizing the liquid crystalline material, and then peeling the liquid crystalline material from the base material.

The obtained broadband λ/4 plate had an Re (450) of 110 nm, an Re (550) of 135 nm, an Re (630) of 140 nm, and a film thickness of 1.6 µm.

The obtained broadband λ/4 plate and the polarizing plate 1 manufactured above were attached together using an acrylic pressure sensitive adhesive having a refractive index of 1.47.

(Formation of reflection polarizer for which Light reflection layer formed by fixing cholesteric liquid crystalline phase is used)

One layer of a reflection polarizer for which a light reflection layer formed by fixing a cholesteric liquid crystalline phase was used was formed on a support by means of coating by changing the added amount of a chiral agent used with reference to pp. 60 to 63 of Fujifilm Research & Development No. 50 (2005).

The obtained reflection polarizer for which a light reflection layer formed by fixing a cholesteric liquid crystalline phase was used was used as cholesteric (B). The cholesteric (B) had a reflection central wavelength of the peak of the maximum reflectivity of 445 nm, a half bandwidth of 70 nm, a film thickness of 2.5 µm, Δn of a liquid crystal of 0.12, and an average refractive index of 1.57. In addition, the cholesteric (B) was produced using a clockwise chiral agent and reflects right-circularly-polarized light.

In addition, in a case in which a liquid crystal having Δn of 0.17 was used, a reflection central wavelength of 450 nm, a half bandwidth of 100 nm, and a film thickness of 2.5 µm could be realized.

<Formation of polarization separating member>

Only the reflection polarizer which was the 2.5 µm-thick cholesteric (B) formed above was peeled off from the support and transferred onto the 1.6 µm-thick broadband λ/4 plate formed above, thereby forming a laminate of a polarization separating member and the polarizing plate 1. The total film thickness of the obtained polarization separating member was 4.1 µm and is shown in Table 1 below.

<Formation of light conversion member>

As a light conversion member, a circularly polarized luminescence fluorescent material that fluorescently emits circularly-polarized green light having a central wavelength of 550 nm and a half bandwidth of 80 nm when fine particles of a compound made of CdS were formed in apoferritin and unpolarized blue light from a blue light-emitting diode enters the fluorescent material was produced with reference to JP2009-242501A.

The wavelength can be controlled by adjusting the diameter of fine nanoparticles, and examples of a method for controlling the wavelength include reduction of the particle diameter by means of irradiation with a laser and adjustment of the concentration of ammonia in a reaction solution. Herein, a fluorescent material having a target wavelength was obtained by adjusting the concentration of ammonia in the reaction solution.

In addition, a circularly polarized luminescence fluorescent material that fluorescently emits circularly-polarized red light having a central wavelength of 610 nm and a half bandwidth of 80 nm when fine particles of a compound made of CdS were formed in apoferritin and unpolarized blue light from a blue light-emitting diode enters the fluorescent material was produced in the same manner as in the production of the circularly polarized luminescence fluorescent material of green light by adjusting the concentration of ammonia in the reaction solution.

A circularly polarized fluorescent sheet RG was produced using the above-described circularly polarized luminescence fluorescent materials by means of the following method.

As a base material, a sheet of isophthalic acid-copolymerized polyethylene terephthalate copolymerized with 6 mol % of isophthalic acid (hereinafter, refer to "amorphous PET") was produced. The glass transition temperature of the amorphous PET is 75° C. A laminate made up of the amorphous PET base material and a circularly polarized luminescence fluorescent material dispersion layer was produced as described below. Here, the circularly polarized luminescence fluorescent material dispersion layer includes the produced circularly polarized luminescence fluorescent material of green light and the circularly polarized luminescence fluorescent material of red light using a polyvinyl alcohol (hereinafter, refer to "PVA") as a matrix. That is, the glass transition temperature of PVA is 80° C.

A fluorescent material-containing PVA aqueous solution was prepared by dissolving PVA powder having a degree of polymerization of 1000 or higher, a degree of saponification of 99% or higher (at a concentration of 4% to 5%) and the circularly polarized luminescence fluorescent material of green light and the circularly polarized luminescence fluorescent material of red light, which had been produced above, (at a concentration of 1% respectively) in water. In addition, a 200 μm-thick amorphous PET base material was prepared. Next, the fluorescent material-containing PVA aqueous solution was applied to the 200 μm-thick amorphous PET base material and was dried at a temperature in a range of 50° C. to 60° C., thereby forming a 25 μm-thick fluorescent material-containing PVA layer on the amorphous PET base material. A laminate of the amorphous PET and the fluorescent material-containing PVA will be called a circular polarization fluorescent sheet RG.

<Manufacturing of liquid crystal display device>

A commercially available liquid crystal display device (manufactured by Panasonic Corporation, trade name: TH-L42D2) was disassembled, the backlight-side polarizing plate was changed to the laminate of the polarization separating member and the polarizing plate 1, which had been manufactured above, the circular polarization fluorescent sheet RG manufactured above was disposed between the polarization separating member and a backlight unit, and the backlight unit was changed to the following B narrowband backlight unit, thereby manufacturing a liquid crystal display device of Example 1.

The B narrowband backlight unit used included a blue light-emitting diode (Nichia B-LED: Royal Blue, main wavelength of 445 nm, a half bandwidth of 20 nm, hereinafter, also referred to as a B light source) as a light source. In addition, the B narrowband backlight unit includes a reflection member which converts right-circularly polarized blue light emitted from the light source and reflected by the polarization separating member to unpolarized blue light and reflects the unpolarized blue light in a rear portion of the light source.

Example 2

<Manufacturing of Liquid Crystal Display Device>

A commercially available liquid crystal display device (manufactured by Panasonic Corporation, trade name: TH-L42D2) was disassembled, and the backlight-side polarizing plate was peeled off so as to expose the liquid crystal display. The broadband λ/4 plate formed in Example 1 was attached onto the liquid crystal cell using an acrylic pressure sensitive adhesive having a refractive index of 1.47.

After that, only the 2.5 μm-thick cholesteric (B) formed in Example 1 was peeled off from the support and transferred onto the broadband λ/4 plate, thereby forming a polarization separating member.

The circular polarization fluorescent sheet RG manufactured in Example 1 was disposed between the polarization separating member and the backlight unit, and the backlight unit was changed to the same B broadband backlight unit as that in Example 1, thereby manufacturing a liquid crystal display device of Example 2.

Comparative Example 1

A liquid crystal display device of Comparative Example 1 was manufactured in the same manner as in Example 1 except for the fact that, in the manufacturing of the liquid crystal display device of Example 1, the polarizing plate 1 manufactured in Example 1 was used instead of the laminate of the polarization separating member and the polarizing plate 1.

Comparative Example 2

A liquid crystal display device of Comparative Example 2 was manufactured in the same manner as in Example 1 except for the fact that, in the manufacturing of the liquid crystal display device of Example 1, a laminate of a 25 μm-thick dielectric multilayer film (trade name DBEF, manufactured by 3M Japan Limited, indicated as DBEF of the related art in Table 1 below) attached to the polarizing plate 1 by providing an adhesive layer was used instead of the laminate of the polarization separating member and the polarizing plate 1.

The dielectric multilayer film (trade name DBEF) has a reflection ratio having a flat peak at an almost constant wavelength in a range of 300 nm to 450 nm to 550 nm to 630 nm which fell into the ultraviolet to blue to green to red range.

[Evaluation]

The liquid crystal display devices of the respective examples and the respective comparative examples were evaluated according to the following standards.

(Front surface luminance)

The front surface luminance (white luminance) of the liquid crystal display device was measured using the method described in "0180" of JP2009-93166A. The results are shown in Table 1 below.

Meanwhile, the front surface luminance of the liquid crystal display device, practically, needs to be 200 cd/m² or higher and is preferably 210 cd/m² or higher and more preferably 220 cd/m² or higher.

(Color reproduction region)

The color reproduction region (NTSC ratio) of the liquid crystal display device was measured using the method described in "0066" of JP2012-3073A. The results are shown in Table 1 below.

Meanwhile, the color reproduction region (NTSC ratio) is preferably 80% or higher, more preferably 90% or higher, and particularly preferably 100% or higher.

(External Light Reflection Ratio)

The external light reflection ratio of the liquid crystal display device was measured using a colorimeter (manufactured by Konica Minolta, Inc., CM-2022) according to the method described in "0069" of JP2009-186605A. The results are shown in Table 1 below.

Meanwhile, the external light reflection ratio of the liquid crystal display device is preferably 10% or lower, more preferably 6% or lower, and particularly preferably 5% or lower.

(Front surface contrast (CR))

The front surface contrast of the liquid crystal display device was measured using the method described in "0180" of JP2009-93166A.

The results are shown in Table 1 below.

Meanwhile, the front surface contrast of the liquid crystal display device is preferably 300 or higher, more preferably 1000 or higher, and particularly preferably 1100 or higher.

16: light conversion member (converting unpolarized blue light to circularly polarized green light and circularly polarized red light)
17G, 17R: circularly-polarized luminescence fluorescent material
31: backlight unit
31A: blue light source
31B: light guide plate
31C: reflection member
32: unpolarized light (incidence light from backlight unit)
33: blue transmitted light (blue light that is circularly-polarized light reflected from polarization separating member)

TABLE 1

| | | Example 1 | Example 2 | Comparative Example 1 | Comparative Example 2 |
|---|---|---|---|---|---|
| Con-stitution | Display-side polarizing plate | Polarizing plate in commercially available LCD | Polarizing plate in commercially available LCD | Polarizing plate in commercially available LCD | Polarizing plate in commercially available LCD |
| | Liquid crystal cell | Liquid crystal cell in commercially available LCD | Liquid crystal cell in commercially available LCD | Liquid crystal cell in commercially available LCD | Liquid crystal cell in commercially available LCD |
| | Backlight-side polarizing plate | Polarizing plate 1 | None | Polarizing plate 1 | Polarizing plate 1 |
| | Polarization separating member or reflection-type polarization film | λ/4 plate Reflection polarizer | Broadband λ/4 plate Cholesteric (B) | Broadband λ/4 plate Cholesteric (B) | None None | None DBEF of the related art |
| | Total thickness of all layers [μm] | 4.1 | 4.1 | 0 | 25 |
| | Light coversion member | Circularly polarized fluorescent sheet RGB light source | Circularly polarized fluorescent sheet RGB light source | Circularly polarized fluorescent sheet RGB light source | Circularly polarized fluorescent sheet RGB light source |
| | Backlight unit — Light source Reflection member | Reflection member 1 | Reflection member 1 | Reflection member 1 | Reflection member 1 |
| Evaluation | Front surface luminance [cd/m²] | 220 | 240 | 80 | 190 |
| | Color reproduction region NTSC ratio [%] | 100 | 100 | 100 | 100 |
| | External light reflection ratio | 5.0% | 6.5% | 5.0% | 5.0% |
| | Front surface contrast | 1200 | 300 | 1200 | 1200 |

From Table 1, it was found that the liquid crystal display device of the present invention was improved in terms of the front surface luminance.

Meanwhile, from Comparative Examples 1 and 2, it was found that, in a case in which a polarization separating member satisfying the constitution of the present invention was not used, the front surface luminance was low. Specifically, it was found from Comparative Example 1 that, in a case in which the polarization separating member was not used, the front surface luminance was significantly low. It was found from Comparative Example 2 that, in a case in which, instead of the polarization separating member satisfying the constitution of the present invention, only one dielectric multilayer film (DBEF) was used was used, the front surface luminance was low.

Meanwhile, it was also found from Table 1 that, in a preferred aspect of the liquid crystal display device of the present invention, the color reproduction region, the external light reflection ratio, and the front surface contrast also became favorable.

EXPLANATION OF REFERENCES

1: backlight-side polarizing plate
2: polarizing plate protective film (inner side)
3: backlight-side polarizer
4: polarizing plate protective film (outer side)
5: polarization separating member
12: λ/4 plate
14: reflection polarizer 34: blue reflected light (blue light that is circularly-polarized light transmitted through polarization separating member)
35: green light that is circularly-polarized light (green light that is circularly-polarized light emitted from light conversion member)
36: red light that is circularly-polarized light (red light that is circularly-polarized light emitted from light conversion member)
37: retroreflective unpolarized light
38: green light that is linearly-polarized light (green light that is linearly-polarized light transmitted through polarization separating member)
39: red light that is linearly-polarized light (red light that is linearly-polarized light transmitted through polarization separating member)
42: liquid crystal cell
44: display-side polarizing plate
45: polarizing plate protective film (outer side)
46: display-side polarizer
47: polarizing plate protective film (inner side)
51: liquid crystal display device

What is claimed is:

1. A liquid crystal display device, comprising:
a backlight unit, a light conversion member, a polarization separating member, a liquid crystal cell, and a display-side polarizer disposed in this order,
wherein the backlight unit includes a light source that emits unpolarized blue light having a light emission central wavelength in a wavelength range of 430 nm to 480 nm and a reflection member that converts, out of right-circularly-polarized light and left-circularly-polarized light in a wavelength range of 430 nm to 480 nm, one circularly-polarized light to unpolarized blue light and reflects the unpolarized blue light;

the light conversion member includes a circularly polarized luminescence fluorescent material that, due to the unpolarized blue light entering the light conversion member, emits green light which has a light emission central wavelength in a wavelength range of 500 nm to 600 nm and is circularly-polarized light and red light which has a light emission central wavelength in a wavelength range of 600 nm to 650 nm and is circularly-polarized light;

the polarization separating member includes a reflection polarizer that separates the unpolarized blue light entering the reflection polarizer in a normal direction to the polarization separating member into blue transmitted light that is one circularly-polarized light of right-circularly-polarized light and left-circularly-polarized light and blue reflected light that is the other circularly-polarized light, transmits at least some of green light in a wavelength range of 500 nm to 600 nm, and transmits at least some of red light in a wavelength range of 600 nm to 650 nm and a λ/4 plate that respectively converts the blue transmitted light that is circularly-polarized light, the green light that is circularly-polarized light, and the red light that is circularly-polarized light to blue light that is linearly-polarized light, green light that is linearly-polarized light, and red light that is linearly-polarized light in this order from a backlight side; and an absorption axis of the display-side polarizer is parallel to vibration directions of the blue light that is linearly-polarized light, the green light that is linearly-polarized light, and the red light that is linearly-polarized light.

2. The liquid crystal display device according to claim 1, wherein the reflection polarizer is a light reflection layer formed by fixing a cholesteric liquid crystalline phase, and the light reflection layer formed by fixing the cholesteric liquid crystalline phase has a reflection central wavelength in a wavelength range of 430 nm to 480 nm, reflects any one of right-circularly-polarized light and left-circularly-polarized light at the reflection central wavelength, transmits the other light, transmits at least some of green light in a wavelength range of 500 nm to 600 nm, and transmits at least some of red light in a wavelength range of 600 nm to 650 nm.

3. The liquid crystal display device according to claim 2, wherein the light emission central wavelength of the unpolarized blue light emitted from the backlight unit is in a wavelength range of 440 nm to 460 nm, the reflection central wavelength of the light reflection layer formed by fixing the cholesteric liquid crystalline phase is in a wavelength range of 440 nm to 460 nm, and a difference between the light emission central wavelength of the unpolarized blue light emitted from the backlight unit and the reflection central wavelength of the light reflection layer formed by fixing the cholesteric liquid crystalline phase is 50 nm or lower.

4. The liquid crystal display device according to claim 1, wherein an angle formed between a slow axis of the λ/4 plate and an absorption axis of the display-side polarizer is 45°, and the λ/4 plate satisfies Expressions (1) to (3) below:

$$Re(\lambda)=\lambda/4\pm10 \text{ nm} \quad \text{Expression (1)}$$

(in Expression (1), λ represents the light emission central wavelength (unit: nm) of blue light that is circularly-polarized light, and Re (λ) represents a retardation (unit: nm) in the in-plane direction at a wavelength of λ nm);

$$Re(\lambda)=\lambda/4\pm10 \text{ nm} \quad \text{Expression (2)}$$

(in Expression (2), λ represents the light emission central wavelength (unit: nm) of green light that is circularly-polarized light, and Re (λ) represents a retardation (unit: nm) in the in-plane direction at a wavelength of λ nm); and $$Re(\lambda)=\lambda/4\pm10 \text{ nm} \quad \text{Expression (3)}$$

(in Expression (3),λ represents the light emission central wavelength (unit: nm) of red light that is circularly-polarized light, and Re (λ) represents a retardation (unit: nm) in the in-plane direction at a wavelength of λ nm).

5. The liquid crystal display device according to claim 1, further comprising:

a backlight-side polarizer between the polarization separation member and the liquid crystal cell, wherein the backlight-side polarizer and the absorption axis of the display-side polarizer are orthogonal to each other.

6. The liquid crystal display device according to claim 5, further comprising:

two polarizing plate protective films on both surfaces of the backlight-side polarizer, wherein, out of the two polarizing plate protective films, at least the polarizing plate protective film on a polarization separation member side is a cellulose acylate film.

7. The liquid crystal display device according to claim 1, wherein all of the green light that is circularly-polarized light and the red light that is circularly-polarized light which are emitted from the light conversion member have a peak with a light emission intensity having a half bandwidth of 100 nm or smaller.

8. The liquid crystal display device according to claim 1, wherein the entire backlight unit is a surface light source.

9. The liquid crystal display device according to claim 1, wherein the unpolarized blue light emitted from the backlight unit has a peak with a light emission intensity a half bandwidth of which is 30 nm or smaller.

* * * * *